US012785822B2

(12) United States Patent
Wolcott, Jr. et al.

(10) Patent No.: US 12,785,822 B2
(45) Date of Patent: Nov. 3, 2026

(54) METHODS, SYSTEMS, AND APPARATUSES FOR IMPROVED NETWORK LEAK IDENTIFICATION

(71) Applicant: Comcast Cable Communications, Inc., Philadelphia, PA (US)

(72) Inventors: Lawrence Wolcott, Jr., Englewood, CO (US); Jonathan Leech, Philadelphia, PA (US); Thomas Bach, Philadelphia, PA (US); Jon-En Wang, Philadelphia, PA (US)

(73) Assignee: Comcast Cable Communications, Inc., Philadelphia, PA (US)

( * ) Notice: Subject to any disclaimer, the term of this patent is extended or adjusted under 35 U.S.C. 154(b) by 379 days.

(21) Appl. No.: 18/477,993

(22) Filed: Sep. 29, 2023

(65) Prior Publication Data

US 2025/0112712 A1 Apr. 3, 2025

(51) Int. Cl.
*H04B 17/17* (2015.01)
*H04B 17/18* (2015.01)
*H04B 17/354* (2015.01)

(52) U.S. Cl.
CPC ............. *H04B 17/17* (2015.01); *H04B 17/18* (2015.01); *H04B 17/354* (2015.01)

(58) Field of Classification Search
CPC ....... H04B 17/17; H04B 17/354; H04B 17/18
See application file for complete search history.

(56) References Cited

U.S. PATENT DOCUMENTS 6,002,671 A 12/1999 Kahkoska et al.
6,425,132 B1 7/2002 Chappell
8,856,850 B2 10/2014 Sala et al.
9,565,580 B2 2/2017 Zinevich
9,832,089 B2 11/2017 Zinevich
10,020,921 B2 * 7/2018 Wei ....................... H04L 5/0048
10,715,213 B1 7/2020 Stelle, IV et al.
10,911,901 B2 2/2021 Huber et al.
11,012,763 B2 5/2021 Solomon et al.
11,758,362 B2 9/2023 Rice et al.
11,953,161 B1 * 4/2024 Rosales Chinchilla ...................... G01M 3/2807
2014/0105251 A1 4/2014 Bouchard
2014/0269867 A1 9/2014 Meller et al.
2015/0029869 A1 1/2015 Wolcott et al.
2015/0181442 A1 6/2015 Zinevich
2015/0341810 A1 11/2015 Murphy
(Continued)

OTHER PUBLICATIONS

Data-Over-Cable Service Interface Specifications DOCSIS® 3.1; CM-SP-PHYv3.1-107-150910; 244 pages; Cable Television Laboratories, Inc. 2013-2015.

*Primary Examiner* — Sulaiman Nooristany
(74) *Attorney, Agent, or Firm* — Ballard Spahr LLP

(57) ABSTRACT

Methods, systems, and apparatuses for identifying network leaks are described herein. Data associated with network leaks may be collected and analyzed to determine a network leak type(s) associated with each network leak. Each network leak type may be associated with a particular radio frequency (RF) radiation pattern. RF radiation patterns as well as corresponding features associated with a number of network leak types may be stored in a database and/or library. A classification model may use the database and/or library to classify an unknown RF radiation pattern as being associated with a leak type(s) of the number of network leak types.

20 Claims, 14 Drawing Sheets

(56) References Cited

U.S. PATENT DOCUMENTS

| | | | |
|---|---|---|---|
| 2016/0036492 | A1 | 2/2016 | Williams et al. |
| 2016/0057638 | A1 | 2/2016 | Zinevich |
| 2016/0119662 | A1 | 4/2016 | Zinevich |
| 2017/0244695 | A1 | 8/2017 | Lund et al. |
| 2017/0272184 | A1 | 9/2017 | Zinevich |
| 2018/0095121 | A1 | 4/2018 | Gilson et al. |
| 2018/0159590 | A1 | 6/2018 | Williams |
| 2018/0219621 | A1 | 8/2018 | Zinevich |
| 2018/0294837 | A1 | 10/2018 | Chapman et al. |
| 2021/0044846 | A1 | 2/2021 | Zinevich |
| 2021/0132133 | A1 | 5/2021 | Wolcott et al. |
| 2021/0135755 | A1 | 5/2021 | Zinevich |
| 2021/0226664 | A1 | 7/2021 | Couch et al. |
| 2021/0250196 | A1 | 8/2021 | Das et al. |
| 2021/0285841 | A1 | 9/2021 | Bouchard |
| 2022/0006542 | A1 | 1/2022 | Stelle, IV et al. |
| 2022/0200715 | A1 | 6/2022 | Zinevich |
| 2022/0299556 | A1 | 9/2022 | Wolcott et al. |
| 2022/0322037 | A1 | 10/2022 | Rice et al. |
| 2023/0024011 | A1 | 1/2023 | Couch et al. |
| 2024/0147271 | A1 | 5/2024 | Primerano et al. |
| 2024/0250764 | A1 | 7/2024 | Stelle et al. |

* cited by examiner

| $v_{max} = \lambda/2T_r$ | | |
|---|---|---|
| $T_r$ | $\lambda$ | $v_{max}$ |
| 50 ms | 2.3 m (130 MHz) | 51 mph (23 m/s) |

METHODS, SYSTEMS, AND APPARATUSES FOR IMPROVED NETWORK LEAK IDENTIFICATION

BACKGROUND

Network leakage detection is an integral aspect of system maintenance. Damage to network infrastructure resulting in a network leak(s) may cause a variety of service issues related to the network. Existing solutions for detecting network leakages do not adequately identify a leak type(s). These and other considerations are discussed herein.

SUMMARY

It is to be understood that both the following general description and the following detailed description are exemplary and explanatory only and are not restrictive. Methods, systems, and apparatuses for identifying network leaks are described herein. Data associated with network leaks may be collected and analyzed to determine a network leak type(s) associated with each network leak. Each network leak type may be associated with a particular radio frequency (RF) radiation pattern. For example, an RF radiation pattern associated with a particular network leak type may be indicative of a number of features that may be used to identify that network leak type. RF radiation patterns and corresponding features associated with different network leak types may be stored in a database and/or library. A classification model may use the database and/or library to classify an unknown RF radiation pattern as being associated with one or more of the network leak types.

Other examples are possible as well. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the present methods, systems, and apparatuses.

DETAILED DESCRIPTION

Figure 1:
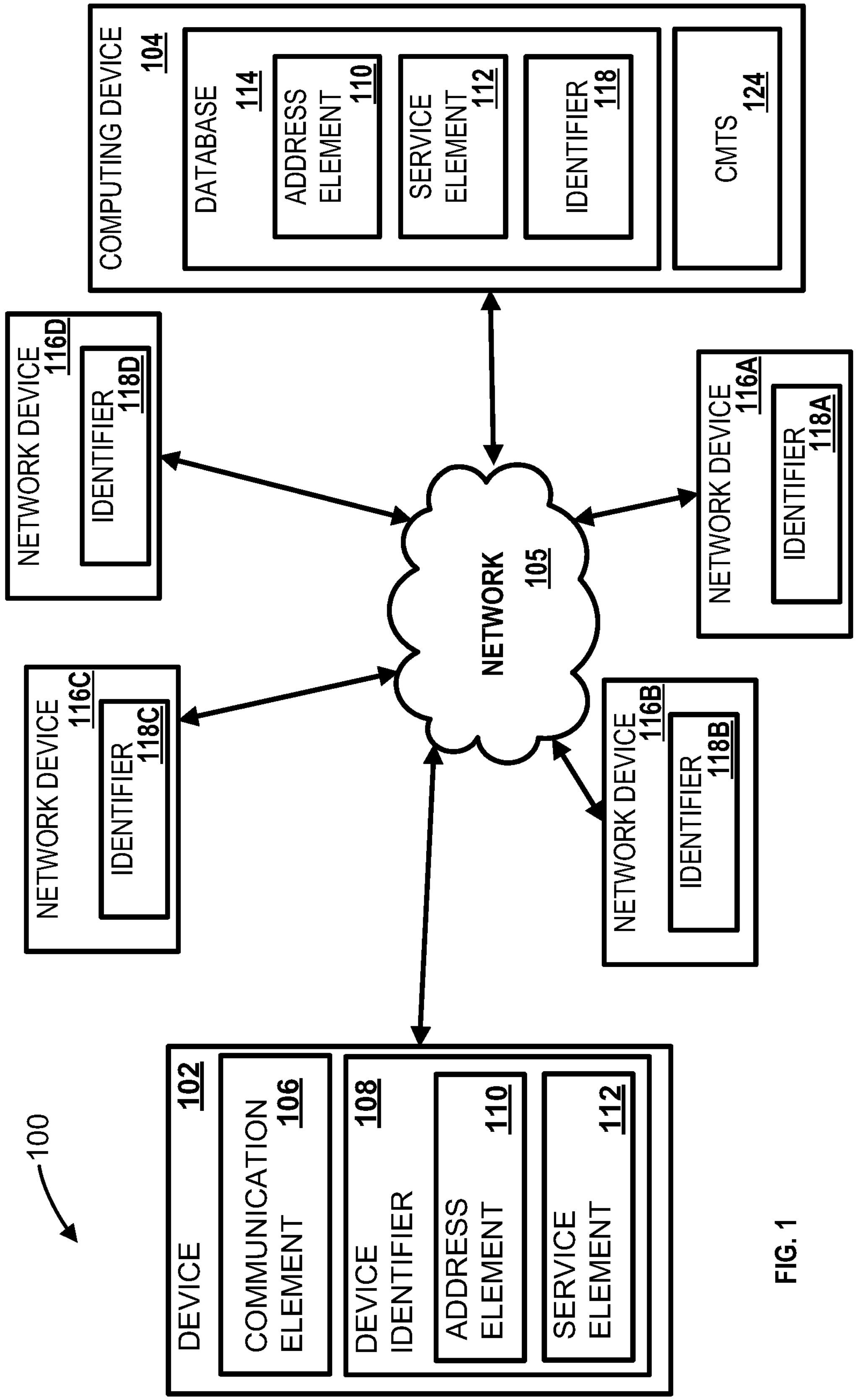
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memrsistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It may be understood that this language may in some cases mean that a system (e.g., a computer) owned and/or controlled by the given entity is actually performing the action.

FIG. 1 shows an example system 100 for locating and/or identifying network leaks. The system 100 may locate and/or identify network leaks based on output (e.g., signals) of one or more devices. For example, the system 100 may be configured to cause one or more devices (e.g., network devices 116A-116D) to output one or more signals. The system 100 may be configured to provide services, such as network-related services, to a device (e.g., device 102, network devices 116A-116D, etc.). The network and system may comprise at least one device 102 in communication with a plurality of network devices 116A-116D and/or a computing device 104, such as a server, for example, via network 105. The computing device 104 may be disposed locally or remotely relative to the device 102 and the network devices 116A-116D. As an example, the device 102, the network devices 116A-116D, and the computing device 104 may be in communication via the network 105 (e.g., a private or public network) such as the Internet or a local area network (LAN). Other forms of communications may be used, such as wired and wireless telecommunication channels, for example.

The device 102 may comprise one or more computing devices, such as user devices, electronic devices such as computers, smartphones, laptops, tablets, set top boxes, display devices, or other devices capable of communicating with the network devices 116A-116D and/or the computing device 104. The device 102 may comprise a communication element 106 for providing an interface to a user to interact with the device 102 and/or the computing device 104. The communication element 106 may be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces may be used to provide communication between the user and one or more of the device 102, the network devices 116A-116D, and/or the computing device 104. As an example, the communication element 106 may request or query various files from a local source and/or a remote source. As a further example, the communication element 106 may transmit data to a local or remote device such as the network devices 116A-116D and/or the computing device 104.

The device 102 may be associated with a user identifier or a device identifier 108. As an example, the device identifier 108 may be any identifier, token, character, string, or the like, for differentiating one user or user device from another user or user device. As a further example, the device identifier 108 may identify a user or user device as belonging to a particular class of users or user devices. As a further example, the device identifier 108 may comprise information relating to the device 102 such as a manufacturer, a model or type of device, a service provider associated with the device 102, a state of the device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, international mobile equipment identity (IMEI) number, international portable equipment identity (IPEI) number, an Internet address, or the like. As an example, the address element 110 may be relied upon to establish a communication session between the device 102 and the network devices 116A-116D and/or the computing device 104 or other devices and/or networks. As a further example, the address element 110 may be used as an identifier or locator of the device 102. In an example, the address element 110 may be persistent for a particular network.

The service element 112 may comprise identification of the service providers associated with the device 102, with the class of device 102, and/or with a particular network 105 with which the device 102 is currently accessing services associated with the service providers. The class of the device 102 may be related to a type of device, capability of device, type of service being provided, and/or a level of service (e.g., business class, service tier, service package, etc.). As an example, the service element 112 may comprise information relating to or provided by a communication service provider (e.g., Internet service provider) that is providing or enabling data flow such as communication services to the device 102. As a further example, the service element 112 may comprise information relating to a preferred service provider for one or more particular services relating to the device 102. In an example, the address element 110 may be used to identify or retrieve data from the service element 112, or vice versa. As a further example, one or more of the address element 110 and the service element 112 may be stored remotely from the device 102 and retrieved by one or more devices such as the device 102 and the computing device 104. Other information may be represented by the service element 112.

The device 102, the network devices 116A-116D, and the computing device 104 may communicate between each other via network 105. The network 105, may include a packet-switched network (e.g., an Internet protocol-based network), a non-packet switched network (e.g., quadrature amplitude modulation-based network), and/or the like. The network 105 may include network adapters, switches, routers, modems, and the like connected through wireless links (e.g., radio frequency, satellite, etc.) and/or physical links (e.g., fiber optic cable, coaxial cable, Ethernet cable, or a combination thereof). The network 105 may include public networks, private networks, wide area networks (e.g., Internet), local area networks, and/or the like. The network 105 may include a content access network, a content distribution network, and/or the like. The network 105 may be configured to provide communication from telephone, cellular, modem, and/or other electronic devices to and throughout the system 100.

The system 100 may comprise a hybrid fiber-coaxial (HFC) network, or a component thereof. For example, the network 105 may employ and/or facilitate various methods for sending desired signals over a coaxial cable such as any version of Data Over Cable Service Interface Specification (DOCSIS). The network 105 may support and/or facilitate low-split, mid-split, high-split, Full Duplex DOCSIS (FDX), and Extended Spectrum DOCSIS (ESD) configurations. For a low-split configuration, the network 105 may support/facilitate upstream frequencies below 42 MHz and/or the like. For a mid-split configuration, the network 105 may support/facilitate frequency division schemes that facilitate bi-directional traffic on a single coaxial cable, where reverse channel signals propagate to a headend (e.g., computing device 104), for example, from 5 to 85 MHZ, and where forward path signals go from the headend (e.g., computing device 104) from 102 MHz to the upper frequency limit. A duplex crossover band may be located from 85 to 102 MHz. For a high-split configuration, the network 105 may support/facilitate downstream frequencies of 258-1002 MHZ and upstream frequencies of 5-204 MHZ. With the increased bandwidth of the high-split configuration in the upstream direction, the Aeronautical Frequency Band (108-137 MHZ) that was in the downstream direction in low-split and mid-split networks may reside in the upstream spectrum. For FDX and ESD configurations, the network 105 may support/facilitate downstream frequencies up to 1800 MHZ and upstream frequencies up to 684 MHZ.

The computing device 104 may comprise a server for communicating with the device 102 and/or the network devices 116A-116D. As an example, the computing device 104 may communicate with the device 102 and/or network devices 116A-116D for providing data and/or services. As an example, the computing device 104 may provide services, such as network (e.g., Internet) connectivity, network printing, media management (e.g., media server), content services, streaming services, broadband services, or other network-related services. The computing device 104 may allow the device 102 to interact with remote resources, such as data, devices, and files. As an example, the computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system. For example, the computing device 104 may be configured to receive, process, and distribute content and/or media signals, such as video signals, audio signals, and data signals within the network 105.

The computing device 104 may be maintained and/or managed by a content and/or a media service provider, such as a cable television (CATV) provider or an Internet service provider (ISP). The computing device 104 may include any reasonably suitable electrical equipment for receiving, storing, and/or re-transmitting content/media signals, such as content/media servers, satellite receivers, modulators/demodulators, edge decoders, and/or the like. For example, the computing device 104 may include a cable modem termination system (CMTS) 124.

The CMTS 124 may be configured as an intermediary between the network devices 116A-116D (e.g., cable modems, multimedia terminal adapters (MTA), set-top boxes, network terminals, etc.) and a backbone network/portion (e.g. the Internet) of the network 105. The CMTS 124 may forward/send data received from a backbone network to the network devices 116A-116D and forward data received from the network devices 116A-116D onto the backbone network. The CMTS 124 may comprise an optical transmitter and an optical receiver for transmitting and/or receiving messages from the network devices 116A-116D. The CMTS 124 may include transmitters and/or receivers for communicating with the backbone network. The CMTS 124 may include a converter that may convert any protocol used within the backbone network to a protocol suitable for data communication with the network devices 116A-116D. For example, the CMTS 124 may send/transmit signals (e.g., media signals, broadband signals, content signals, etc.) downstream to the network devices 116A-116D via a fiber-optic connection/communication link to a fiber optic node supporting the network devices 116A-116D. The fiber optic node may, for example, receive and convert optical signals sent from the computing device 104 to RF signals that are sent to the network devices 116A-116D via distributed taps (e.g., subscriber taps, etc.) distributed via coaxial cables to the network devices 116A-116D, respectively.

The computing device 104 may be configured to manage the communication between the device 102 and network devices 116A-116D. The computing device 104 may comprise a database 114 for storage of data sent/received to/from the device 102 and/or network devices 116A-116D. As an example, the database 114 may store a plurality of files (e.g., web pages), user identifiers or records, or other information. As a further example, the device 102 may request and/or retrieve a file from the database 114. The database 114 may store information relating to the device 102 such as the address element 110 and/or the service element 112. As an example, the computing device 104 may obtain a device identifier 108 from the device 102 and retrieve information from the database 114 such as the address element 110 and/or the service element 112. As a further example, the computing device 104 may obtain the address element 110 from the device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 and/or with any other device or entity within the system 100.

The computing device 104 may be configured to send instructions to the device 102. The instructions may cause (e.g., via the device 102) one or more user devices (e.g., network devices 116A-116D) to send one or more upstream transmissions. The device 102 may be configured, as further described herein, to detect one or more signals associated with the one or more user devices sending the one or more upstream transmissions. The one or more signals detected by the device 102 may be associated with one or more of a type, a classification, or a location(s) of one or network leaks as further described herein.

The network devices 116A-116D may be any device configured to communicate with the computing device 104, including the CMTS 124, for example, within a local network of the respective users/subscribers premises. For example, the network devices 116A-116D may be configured to interface with a display, an Internet of Things (IoT) device, a mobile device, one or more sensors, and/or the like. For example, the network devices 116A-116D may comprise user premises devices such as set top boxes, cable boxes, routers, cable modems, multimedia terminal adapters (MTA), network terminals, or any combination thereof. The network devices 116A-116D may be configured to interface with any local network device with an Internet Protocol (IP) and/or Media Access Control (MAC) address, such as a local computer, a wired and/or wireless router, a local content server, and/or the like. The network devices 116A-116D may forward data/information received from the computing device 104/CMTS 124 to any devices, for example, within a local network of the respective users/subscribers premises, and may forward data received from any device to the computing device 104/CMTS 124. The specific configuration of the network devices 116A-116D may vary. Each of the network devices 116A-116D may include a converter that may convert signals and/or data/information to signals and/or data/information suitable for any devices, for example, within a local network of the respective users/subscribers premises.

The network devices 116A-116D may be configured to facilitate the connection of a user device (e.g., devices within a user's home) to the network 105. For example, the network devices 116A-116D may be configured as wireless access points (WAPs). The network devices 116A-116D may be configured to allow one or more wireless devices to connect to a wired and/or wireless network using Wi-Fi, Bluetooth®, Zigbee®, or any desired method or standard. The network devices 116A-116D may comprise identifiers 118A-118D. As an example, one or more identifiers may be, or relate to, an Internet Protocol (IP) Address IPV4/IPV6 or a media access control address (MAC address) or the like. As a further example, the identifiers 118A-118D may be unique identifiers for facilitating communications on the physical network segment. Each of the network devices 116A-116D may comprise an identifier 118A-118D that is distinct. As an example, the identifiers 118A-118D may be associated with a physical location of the network devices 116A-116D.

Figure 2:
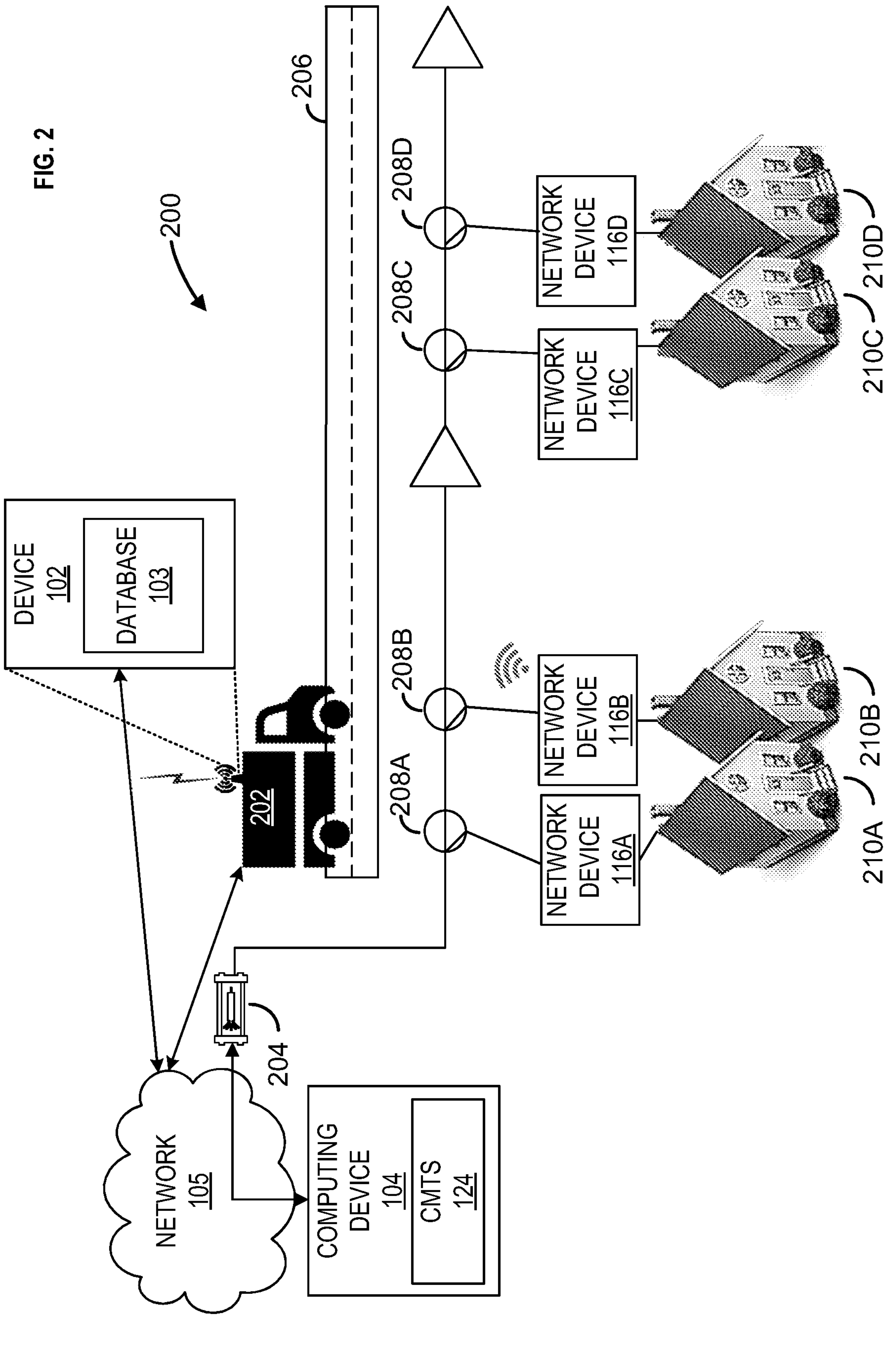
FIG. 2 shows another example system.

FIG. 2 shows an example system 200, which may be a variant of the system 100. The device 102, the network devices 116A-116D, and the computing device 104 may communicate between each other via the network 105. The device 102 may be configured with and/or located within a vehicle 202. The vehicle 202 may be any type of vehicle, mobile device, and/or moving object, such as a car, a bicycle, an autonomous vehicle/drone, an aircraft, a watercraft, human-powered and/or facilitated mobility, and/or the like. Although the device 102 is shown to be configured with the vehicle 202, the device 102 may be configured and/or associated with any type of device, such as a mobile device, a smart device, a computing device, a personal computing device, and/or the like.

The vehicle 202 and/or the device 102 may travel along a path 206. The path 206 may be, for example, a service area of and/or supported by the CMTS 124. The device 102 may be configure with a global positioning system (GPS) sensor/antenna configured to, either periodically or consistently, determine and/or record the location (e.g., current GPS coordinates, etc.) of the device 102. The device 102 may also be synchronized to a GPS clock to establish timing consistent with the timing communicated with the computing device 104. The device 102 may include a velocity meter, an accelerometer, a positioning sensor, and/or the like configured to, either periodically or consistently, determine the velocity, speed, and/or orientation of the device 102. The device 102 may send the computing device 104 location information that includes a location (e.g., GPS coordinates, etc.) of the device 102 and a travel speed (e.g., velocity, etc.) of the device 102 and timing information associated with one or more determined/detected network leaks.

The device 102 may be configured to communicate with the computing device 104 to receive location information (e.g., GPS coordinates, etc.) associated with the network devices 116A-116D along the path 206. For example, the device 102, based on the location information associated with the device 102, may determine that the computing device 104 (and/or the device 102) is in proximity to and/or services the network devices 116A-116D along the path 206. The device 102 may receive information from the computing device 104 that includes, for example, the number of network devices 116A-116D along the path 206, the type of network devices 116A-116D, configuration details associated with the network devices 116A-116D, the location information associated with the network devices 116A-116D, and/or any other information associated with the network devices 116A-116D.

Network leak location information may be determined by, for example, the device 102 as the device 102 travels along the path 206. The device 102 may be configured to cause one or more network devices 116A-116BD to output one or more signals for locating one or more network leaks. As an example, the device 102 may be configured to send instructions for upstream transmissions to the computing device 104 for the computing device 104 to cause the one or more network devices 116A-116D to output the one or more signals. The one or more signals may be based on an orthogonal frequency division multiple access upstream data profile (OUDP) test burst. Each signal of the one or more signals may comprise a pulse signal of two or more pulses output at an interval over a period of time.

The device 102 may determine one or more parameters of the one or more signals to be output by the one or more network devices 116A-116D based on a velocity of the device 102 and a quantity of the one or more network devices 116A-116D within a communication range of the device 102. The one or more parameters may comprise at least one of an interval each signal is output over a period of time, a pulse width of each signal, a pulse repetition period of each signal, or a number of pulses of each signal to output. The interval each signal is output over the period of time may be determined based on a velocity associated with the device 102. For example, the interval may be proportional to the velocity or may be adjusted based on the velocity. The device 102 may determine the one or more network devices 116A-116D to output the one or more signals based on location information comprising a location associated with the one or more devices.

The device 102 may cause the one or more network devices 116A-116D to output the one or more signals based on the one or more parameters. The device 102 may determine one or more locations of one or more network leaks based on a detection of the one or more signals. For example, as the device travels along the path 206, the device 102 may determine a location associated with each detection of a plurality of detections of each signal of the one or more signals over a period of time (e.g., based on a velocity of the device 102 over the period of time associated with each detection). The device 102 may determine the one or more locations of one or more network leaks based on a correlation of each location associated with each detection of each signal over the period of time. For example, each detection of a plurality of detections of each signal, over the period of time, may be correlated to each other. Thus, the accuracy of the location of each signal (and thus, each network leak) increases with each detection.

As the vehicle 202 and/or the device 102 travels along the path 206, the device 102 may capture signals associated the network leaks. For example, to capture the signals associated the network leaks, the device 102 may comprise or be in communication with an electromagnetic field (EMF) meter, a radio frequency (RF) spectrum analyzer, an RF field strength meter, a combination thereof, and/or the like. For example, the system 200 may comprise a hybrid fiber-coaxial (HFC) network, or a component thereof. In HFC networks, which may combine fiber optic and coaxial cable technologies, network leaks may emanate from various sources (e.g., network infrastructure) that cause unintended electromagnetic radiation or signal leakage, leading to potential signal integrity issues, service disruptions, security concerns, interference, etc. The device 102 may capture signals associated with such leaks so those signals may be analyzed to determine a cause(s)/source(s) of the corresponding network leak(s), as further described herein.

Each of the network leaks may be associated with at least one network leak type of a plurality of network leak types. Each network leak type may be associated with a cause(s)/source(s). For example, a first network leak type may be related to a loose connector/cable, which may be caused by poorly connected or loose coaxial cable connectors that lead to signal leakage. Another network leak type may be related to a damaged cable(s). For example, physical damage to coaxial cables, such as cuts, bends, and/or crushed sections, may damage shielding and expose a core of the cable and lead to signal leakage. Physical damage may be caused by digging, weather events, animal intrusion, etc. A further network leak type may be related to deterioration of coaxial cables, which may have shielding that weakened over time, as well as aging connectors and cables and/or poor cable quality. Further examples of network leak types may be related to improper grounding, improper installation, equipment malfunction (e.g., faulty amplifiers and/or distribution components, interference from a nearby device(s) (e.g., external sources of interference, such as wireless devices), environmental factors, and the like.

Leakage data related to the signals captured by the device 102 may be stored for further analysis to determine the cause(s)/source(s) of the corresponding network leak(s), as further described herein. For example, the device 102 may comprise or be in communication with a database 103 to store the leakage data. The database 103 may, in some examples, comprise or be associated with the database 114 and/or one or more storage media in communication with the device 102 (not shown).

The CMTS 124 may be an intermediary between the network devices 116A-116D (e.g., cable modems, multimedia terminal adapters (MTA), set-top boxes, network terminals, etc.) and a backbone network/portion (e.g. the Internet) of the network 105. The CMTS 124 may forward/send data received from a backbone network to the network devices 116A-116D and forward data received from the network devices 116A-116D onto the backbone network. The CMTS 124 may comprise an optical transmitter and an optical receiver for transmitting and/or receiving messages from the network devices 116A-116D. The CMTS 124 may include transmitters and/or receivers for communicating with the backbone network. The CMTS 124 may include a converter that may convert any protocol used within the backbone network to a protocol suitable for data communication with the network devices 116A-116D. For example, the CMTS 124 may, send/transmit signals (e.g., media signals, broadband signals, content signals, etc.) downstream to users/subscribers 210A-210D, via a fiber-optic connection/communication link to a fiber optic node 204 supporting the users/subscribers 210A-210D. The fiber optic node 204 may, for example, receive and convert optical signals sent from the computing device 104 to RF signals that are sent to the users/subscribers 210A-210D via distributed taps 208A-208D (e.g., subscriber taps, etc.) distributed via coaxial cables to the network devices 116D-116D, respectively.

Figure 3A:
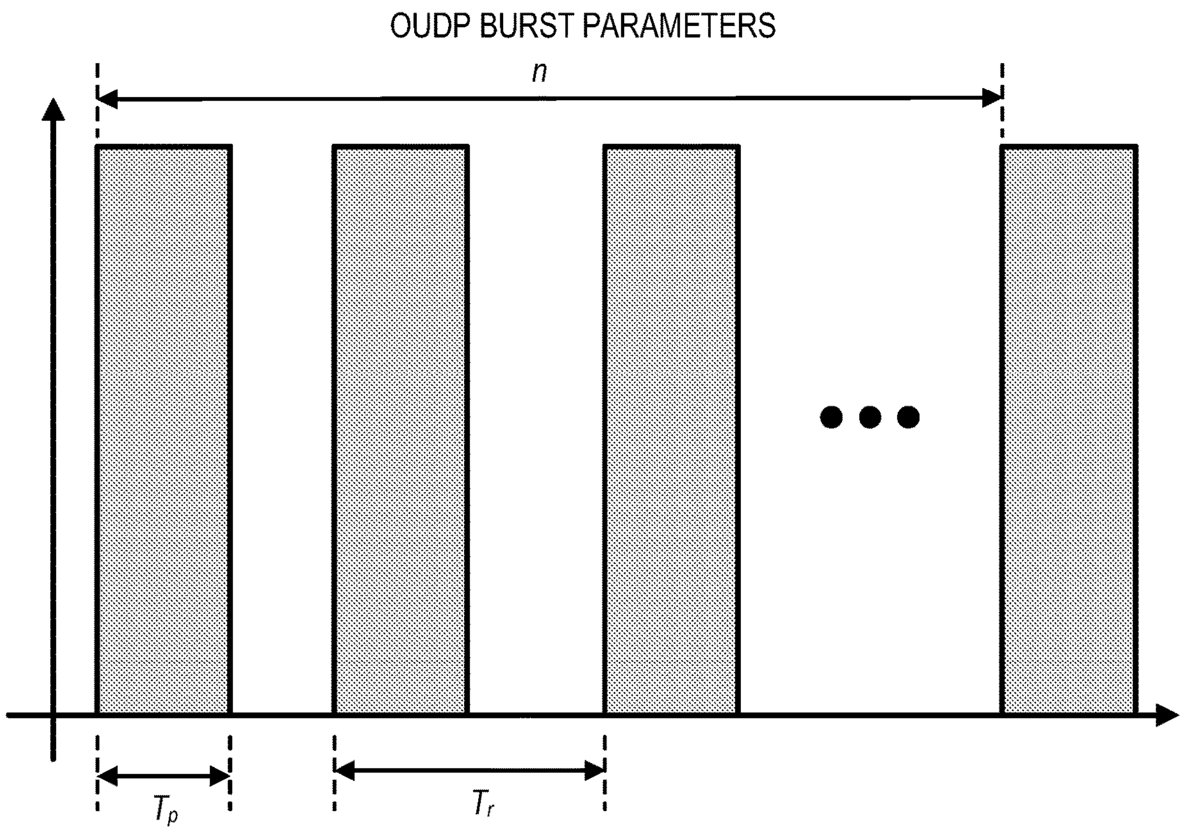
FIG. 3A shows an example signal structure.

FIG. 3A shows an example signal structure of the pulse signal that may be output by the one or more user devices (e.g., network devices 116A-116D). The OUDP burst shown in FIG. 3A may consist of a series of identical pulses transmitted at a specified period. The waveform may have a first autocorrelation peak at a lag of $T_r$. The phase of this peak provides a Doppler frequency estimate, allowing an estimate of the velocity between the (stationary) leak and the detector (e.g., device 102). The waveform may be defined by one or more parameters such as an OUDP burst width ($T_p$), a burst repetition period ($T_r$), and a number of transmitted bursts (n). Each of these parameters may impact the detection sensitivity and Doppler resolution, enabling the waveform parameters to be customized based on the RF environment (e.g., rural area vs. urban area). The pulse width ($T_p$) parameter sets the detection sensitivity. The relationship between the pulse width, signal bandwidth, and processing gain is approximately $PG_2=10\log(T_p*BW)$. For example, using the typical values of $T_p=5$ ms and BW=1.6 MHZ, PG=10 log (8000)=39 dB. The value of the pulse repetition period ($T_r$) sets the maximum unambiguous velocity that may be measured, $v_{max}=\lambda/2T_r$. For example, when both the transmitter and receiver are stationary, the phase of the autocorrelator's output peak is zero. If there is relative motion between the two, the phase will be non-zero. The phase of the peak encodes the distance (in wavelengths) the receiver has traveled between pulses. The receiver may travel no more than one half of a wavelength between pulses for unambiguous measurement. For example, using typical values of $T_r=50$ ms and $\lambda=2.3$ meters (f=130 MHz), $v_{max}=23$ m/s=51 mph. The minimum number of pulses (n) that may be transmitted is two, resulting in a single peak at the detector. Transmitting n pulses results in n−1 detection events. If the relative motion between the transmitter and the receiver is constant over the duration of pulses, the detection events may be coherently averaged to form a single effective detection. In an example, the overall processing gain becomes $PG_n=10\log(n-1)+PG_2$. For example, transmitting n=5 pulses gives a 6 dB increase in processing gain over the two-pulse burst.

Figure 3B:
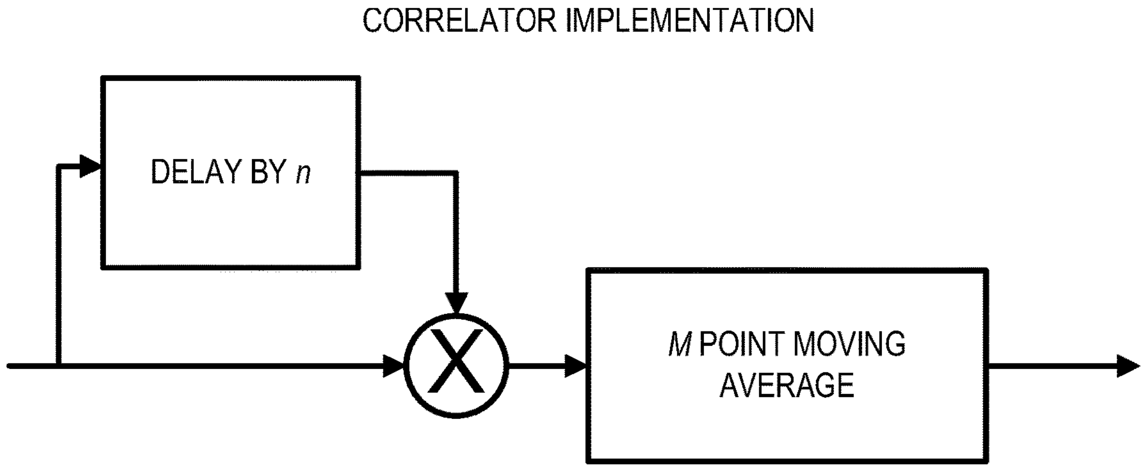
FIG. 3B shows an example data correlator.

FIG. 3B shows an example data correlator. The detector may calculate the autocorrelation of the signal at a 50 ms lag, which is the known OUDP pulse repetition period. Effectively, one pulse within the pulse signal may become the matched filter of the next pulse (e.g., with some noise added). The potential processing gain=10*log(pulse width*bandwidth) (e.g., for a 5 ms pulse at 1.6 MHZ=39 dB). The autocorrelation-based detection method may be "blind." and thus, requires no knowledge of the transmitted signal and is sensitive only to the repetition within the signal. However, a signal exhibiting a repetition of length $T_r$ may pass through the detection, appearing as interference. The one or more OUDP leakage burst parameters may be tuned/adjusted based on background interference characteristics to minimize their impact on detector performance. For example, the waveform parameter selection may be tuned based on the environment (e.g., urban environment vs. rural environment). In a dense urban environment where there may be several cable modems in RF range, within a close proximity to the receiver's path of travel, a narrow pulse width ($T_p$) may be used. This results in low sensitivity. However, a larger number of devices may be scheduled to output the one or more signals in a fixed time interval. Since homes may be near the road, RF path loss and the sensitivity loss may be acceptable. In a sparse rural environment where there are few cable modems in RF range, far away from the receiver's path of travel, a wide pulse width ($T_p$) may be used. This may result in a high sensitivity. However, fewer devices may be scheduled to output the one or more signals in a fixed time interval. Since homes may be far away from the road, the high sensitivity pulse may overcome the RF path loss.

Figure 4:
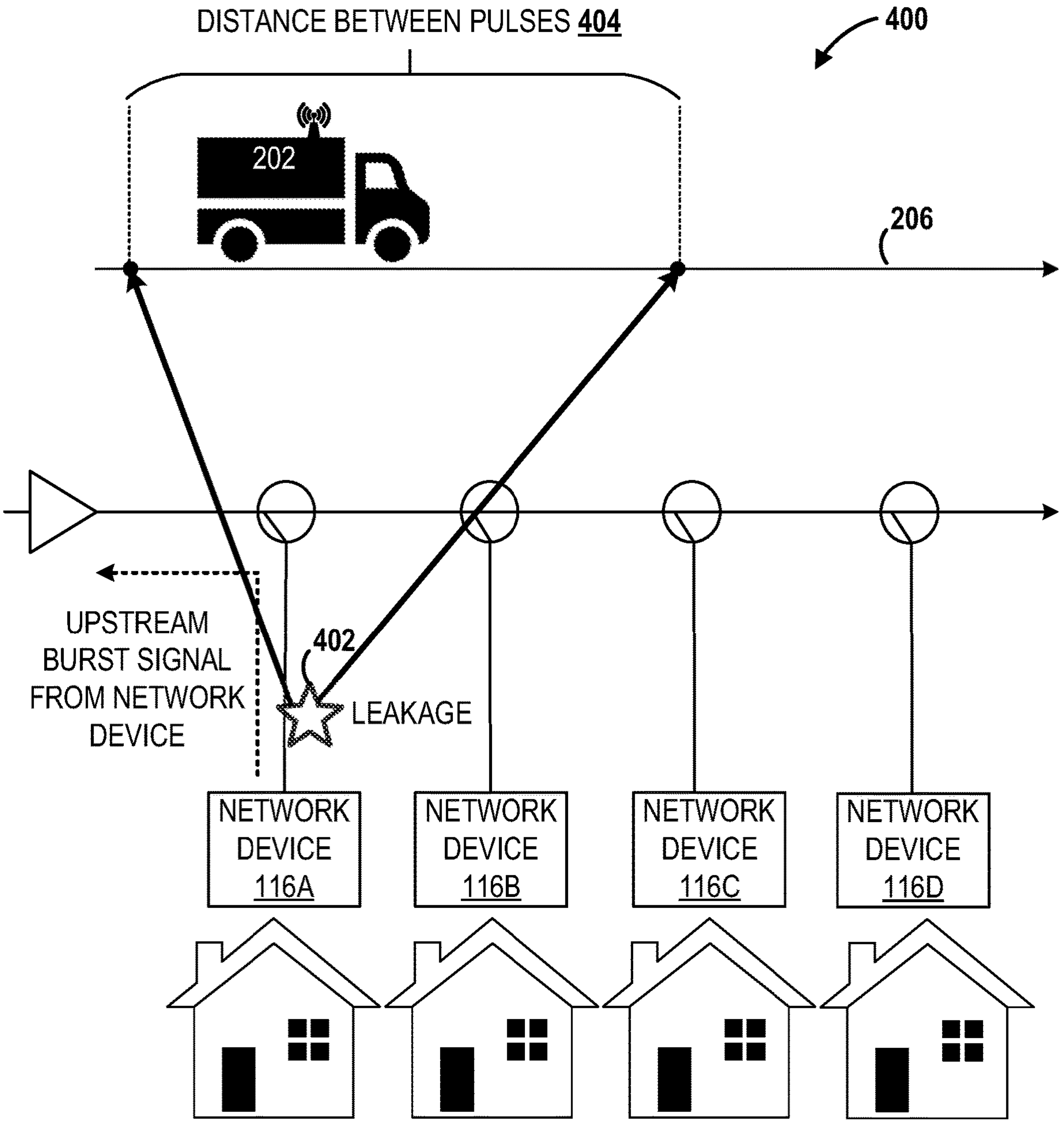
FIG. 4 shows an example system.

FIG. 4 shows various entities and elements of the systems 100, 200 as an example system 400 for comparing a velocity ($v_{max}$) and a distance (shown as distance 404) that the vehicle 202 may travel along the path 206 between pulses for unambiguous measurements of a pulse signal emanating from a network leak source 402. For example, a maximum velocity of the vehicle 202 ($v_{max}$) may be measured, which may be based on a pulse repetition period ($T_r$). The maximum velocity ($v_{max}$) may be determined based on the equation, $v_{max}=\lambda/2T_r$, wherein λ represents a distance a receiver, such as the device 102 within the vehicle 202, travels between pulses. Using example values of 50 milliseconds for the pulse repetition period ($T_r$) and 2.3 meters as the distance 404 the receiver may travel between pulses (λ), the maximum velocity ($v_{max}$) that may be measured as the receiver travels along the path 206 in order to detect the pulse signal is 23 m/s, or 51 mph. In situations where velocity ambiguity may occur, the pulse repetition period ($T_r$) may be varied from one pulse burst to the next, similar to staggered Pulse Repetition Frequency (PRF) waveforms used in RADAR for Doppler ambiguity resolution, in order to resolve the velocity ambiguity. Data related to the measurements of the pulse signal(s) emanating from the network leak source 402 may be stored in the database 103.

As the vehicle 202 travels along the path 206 and collects data associated with detected signal(s) emanating from with a network leak source (e.g., the network leak source 402), multiple samples may be accumulated by traversing different directions (e.g., vectors) through the radiation field in space. For example, the vehicle 202 may drive past the network leak source leak in multiple directions on a same street, around a corner, and/or through an alley, which may result in multiple samples/signals being detected along with corresponding data that may indicate a location, a speed, a direction, and/or a magnitude of the network leak. Such data along with the multiple samples/signals may be captured by the device 102 within the vehicle 202 and stored in the database 103. A network leak may essentially function, albeit unintentionally, as an antenna that produces a particularly-shaped radiation pattern based on the corresponding network leak type (referred to herein as an "RF radiation pattern"). Therefore, a particular network leak type may be identified according to its corresponding RF radiation pattern, which may be based on physical characteristics of the network leak source(s).

Figure 5:
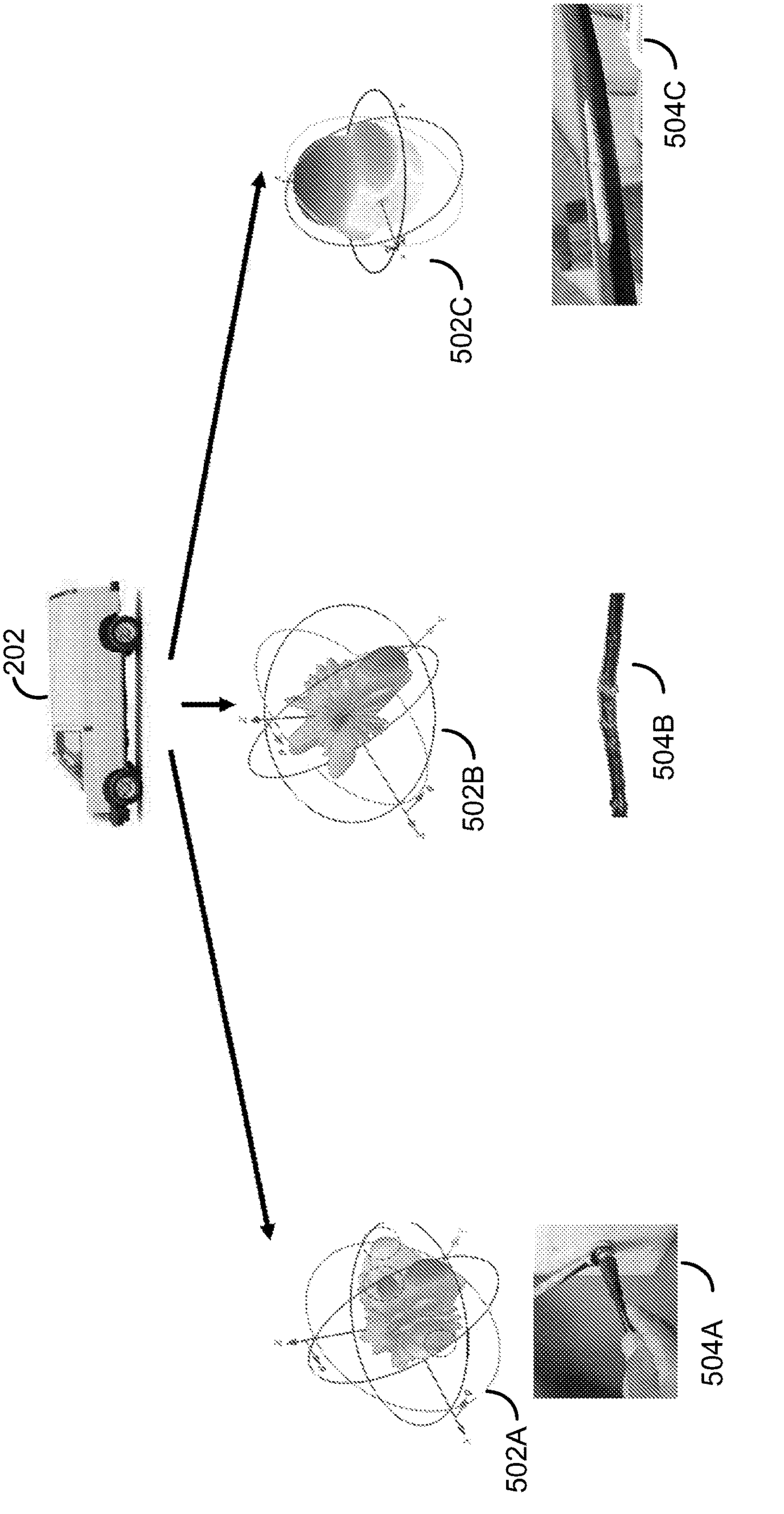
FIG. 5 shows example radiation patterns and leak types.

FIG. 5 shows a plurality of RF radiation patterns 502A-502C. The plurality of RF radiation patterns 502A-502C may be generated as further described herein based on data related to measurements of one or more signals emanating from one or more locations/sources (e.g., data stored in the database 103). The plurality of RF radiation patterns 502A-502C may each be associated with one or more network leak types of a plurality of network leak types 504A-504C. The plurality of network leak types 504A-504C may each be associated with a particularly-shaped radiation pattern of the plurality of RF radiation patterns 502A-502C based on the corresponding network leak type. A particular network leak type may be identified according to its corresponding RF radiation pattern, which may be based on physical characteristics of the network leak source. The database 103 may comprise a mapping between RF radiation patterns and network leak sources and types. For example, as shown on FIG. 5, the network leak type 504A may be a loose connection, which may produce a first RF radiation pattern 502A based on physical characteristics of the loose connection/leak source. As another example, the network leak type 504B may be a chewed cable, which may produce a second RF radiation pattern 502B based on physical characteristics of the chewed cable/leak source. As a further example, the network leak type 504C may be a cracked cable hardline, which may produce a third RF radiation pattern 502C based on physical characteristics of the cracked cable hardline/leak source. Other examples of RF radiation patterns and network leak sources and types are possible as well.

Figure 6:
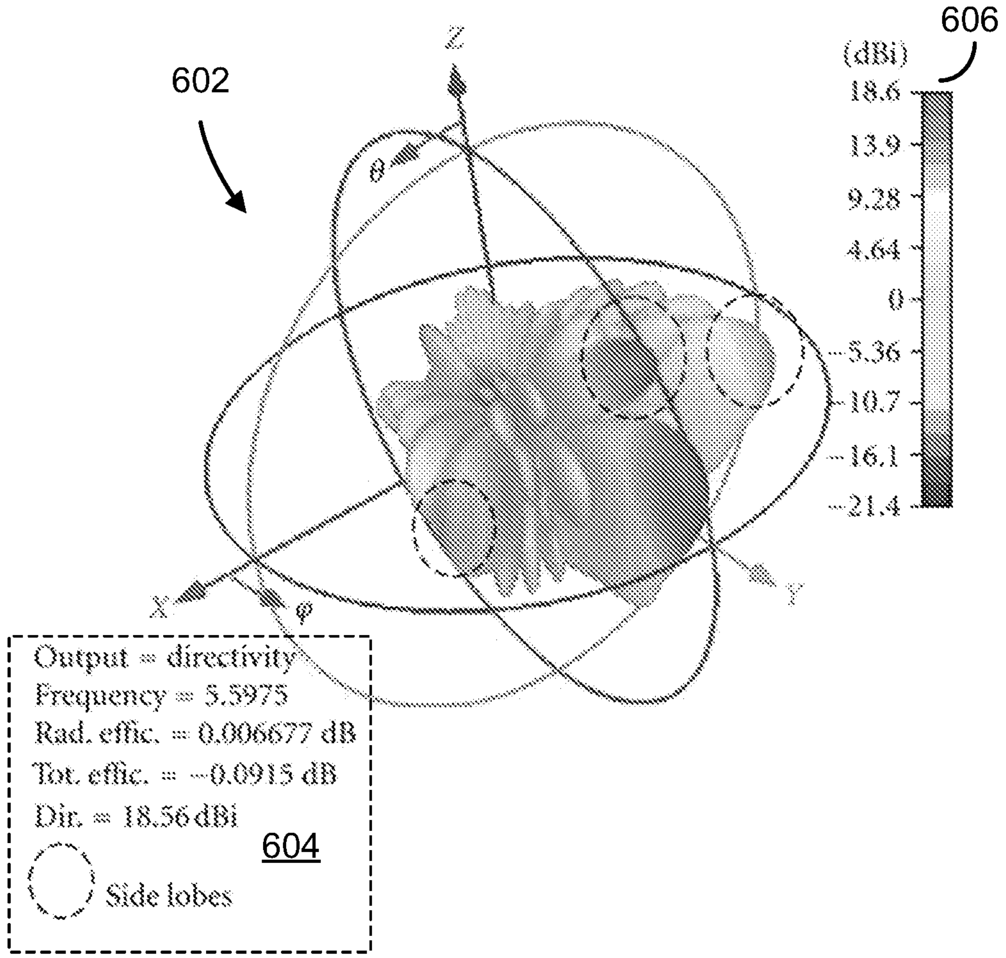
FIG. 6 shows an example radiation pattern.

FIG. 6 shows an example RF radiation pattern 602. The RF radiation pattern 602 may correspond to the first RF radiation pattern 502A and the network leak type 504A (e.g., a loose connection). The device 102 and/or another device(s) in communication therewith may use the data stored in the database 103 (e.g., data collected by the device 102) to generate the RF radiation pattern 602 (e.g., using simulation software). The RF radiation pattern 602 may indicate one or more features 604 associated with the network leak and/or the RF energy emanating therefrom. The RF radiation pattern 602 may indicate how such RF energy is radiated in space as a function of direction (e.g., x, y, and z axes). The RF radiation pattern 602 may be based on physical properties of the network leak source indicative of the network leak type 504A (e.g., the loose connection). As shown in FIG. 6, a strength 606 of the RF energy associated with the network leak may vary, and relatively higher levels of RF energy strength may be shown as one or more side lobe(s) 604.

Figure 7:
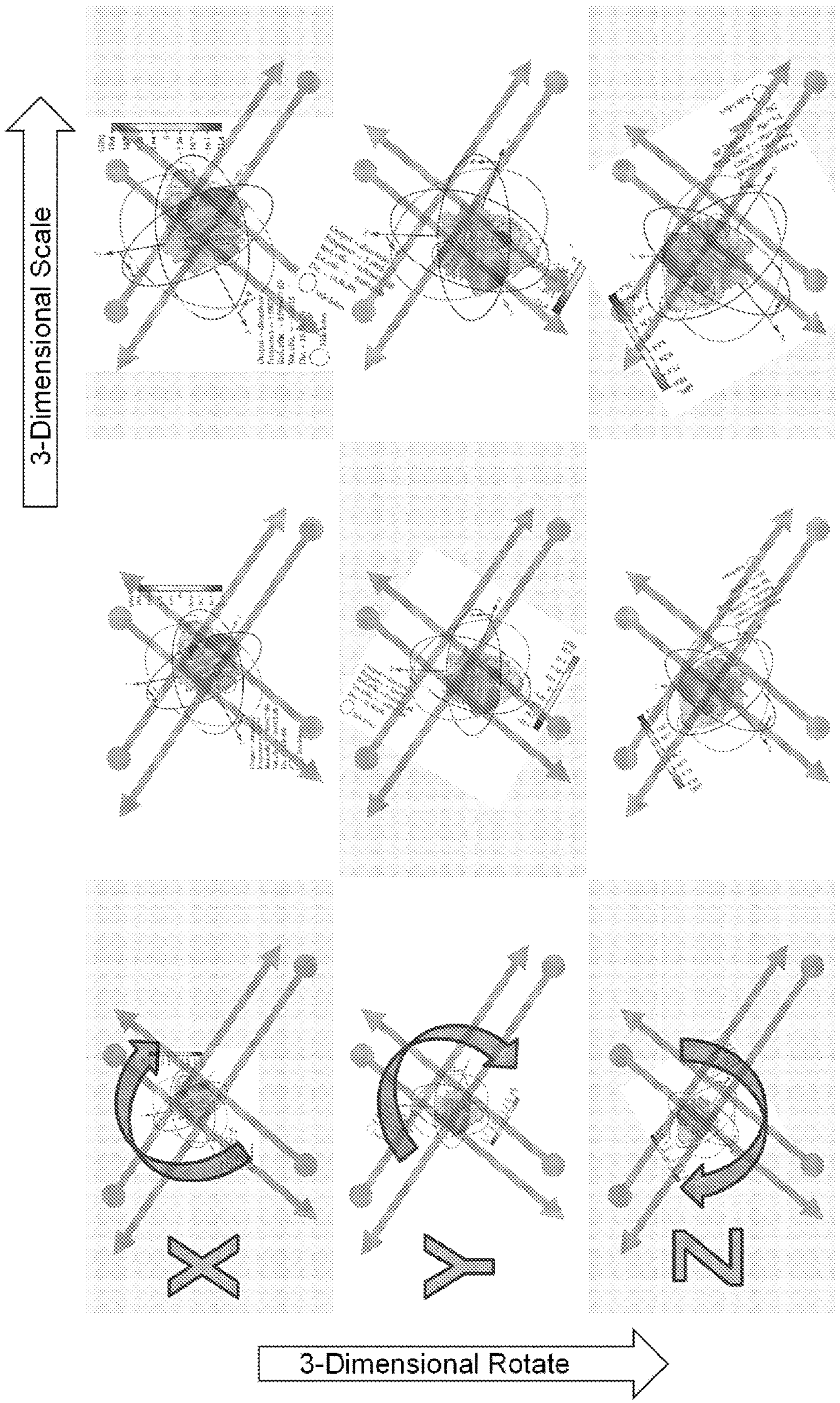
FIG. 7 shows an example orbital analysis.

The RF radiation pattern 602 may be analyzed to determine a cause(s)/source(s) of the corresponding network leak(s). For example, as shown in FIG. 7, analysis of the RF radiation pattern 602 may comprise a three-dimensional (3D) orbital analysis. The 3D orbital analysis which may involve a series of normalizing steps and rotations of the RF radiation pattern 602 in 3D space in order to analyze how such RF energy is radiated as a function of direction (e.g., x, y, and z axes). The RF radiation pattern 602 may be normalized to a scale of one or more known RF radiation patterns (e.g., stored in the database 103). For example, the one or more known RF radiation patterns stored in the database 103 may each be associated with a mapping between the known RF radiation pattern and a known network leak source and/or network leak type. The mapping for a given known RF radiation pattern may indicate a leak strength(s) at various positions/orientations of the known RF radiation pattern and the known network leak source and type (e.g., derived from data related to measurements of a signal(s) emanating from the known network leak source).

To normalize the RF radiation pattern 602 with respect to the known radiation pattern(s) stored in the database 103, a magnitude and/or a shape of the RF radiation pattern 602 may be adjusted. For example, an amplitude of the RF radiation pattern 602 may be scaled to match an amplitude of the known radiation pattern(s) (e.g., using a scaling factor). As another example, a phase of the RF radiation pattern 602 may be adjusted/scaled to match a phase of the known radiation pattern(s) (e.g., by a certain amount and/or using a phase correction technique(s)). As a further example, a frequency of the RF radiation pattern 602 may be normalized to match a frequency of the known radiation pattern(s). Other normalization techniques may be used as well.

The RF radiation pattern 602 (e.g., once normalized) may be rotated along the x, y and/or z axis a number of times each as shown in FIG. 7. For example, the RF radiation pattern 602 may be rotated along a particular axis by a certain angle and/or using a geometric transformation(s)). The RF radiation pattern 602 may be rotated to match one or more orientations associated with the known radiation pattern(s) (e.g., one or more orientations that were used when analyzing the known radiation pattern(s)). At each orientation/position, a plurality of features associated with the RF radiation pattern 602 may be determined (e.g., calculated). For example, the plurality of features may comprise frequency, strength, polarization, shape, distortion, etc., and each feature of the plurality of features may have a corresponding value (or attribute) determined for it at each orientation/position. In other words, the values for each feature of the plurality of features may vary depending on the particular orientation/position.

The frequency of the RF radiation pattern 602 determined at each orientation/position of may be indicative of a signal type(s) being emitted and/or a frequency band associated with the signal(s). The strength of the RF radiation pattern 602 determined at each orientation/position of may be indicative of a severity of damage to the corresponding network infrastructure component, such as a cable/wire, etc., and/or an amount of leakage that is occurring. The polarization of the RF radiation pattern 602 determined at each orientation/position of may be indicative of an orientation of the corresponding network infrastructure component (e.g., cable/wire, etc.) as well as, in some examples, a type of the corresponding network infrastructure component (e.g., a type of a cable/wire, etc.). The shape of the RF radiation pattern 602 at each orientation/position of may be indicative of a location and/or an orientation of the damaged area(s) of the corresponding network infrastructure component (e.g., orientation of a cable/wire, etc.). The distortion associated with the RF radiation pattern 602 determined at each orientation/position of may be indicative of interference from a nearby object(s)/device(s) and/or a change(s) in an impedance of the corresponding network infrastructure component (e.g., impedance of a cable/wire, etc.).

The value(s) for each feature of the plurality of features associated with the RF radiation pattern 602 may vary depending on the particular orientation/position, and those value(s) may be compared against corresponding value(s) associated the known radiation pattern(s) (e.g., at each orientation/position). Such a comparison may be used to determine a known radiation pattern that best fits the RF radiation pattern 602. The best-fitting known radiation pattern may be associated with a particular network leak source(s) and/or a particular network leak type(s) (e.g., based on the mapping in the database 103). The particular network leak source(s) and/or the particular network leak type(s) may be determined to be associated with the RF radiation pattern 602 based on the comparison/best fit determination.

For example, the device 102 and/or another device(s) in communication therewith may comprise a multiclass classification model (e.g., a machine learning model). As further described herein, the multiclass classification model may receive an unknown RF radiation pattern (e.g., the RF radiation pattern 602) and/or value(s) for each feature of a plurality of features associated with the unknown RF radiation pattern as an input(s). The multiclass classification model may determine a best-fitting known radiation pattern based on the input(s). For example, the multiclass classification model may comprise a plurality of classification models that are each associated with a particular network leak source(s) and/or a particular network leak type(s), and the multiclass classification model may output a confidence score associated with the unknown RF radiation pattern and each classification model of the plurality of classification models. For example, each confidence score may indicate a corresponding level of confidence that the unknown RF radiation pattern is associated with a particular model of the plurality of classification models, and each particular model may be associated with a particular network leak source(s) and/or a particular network leak type(s).

Figure 8:
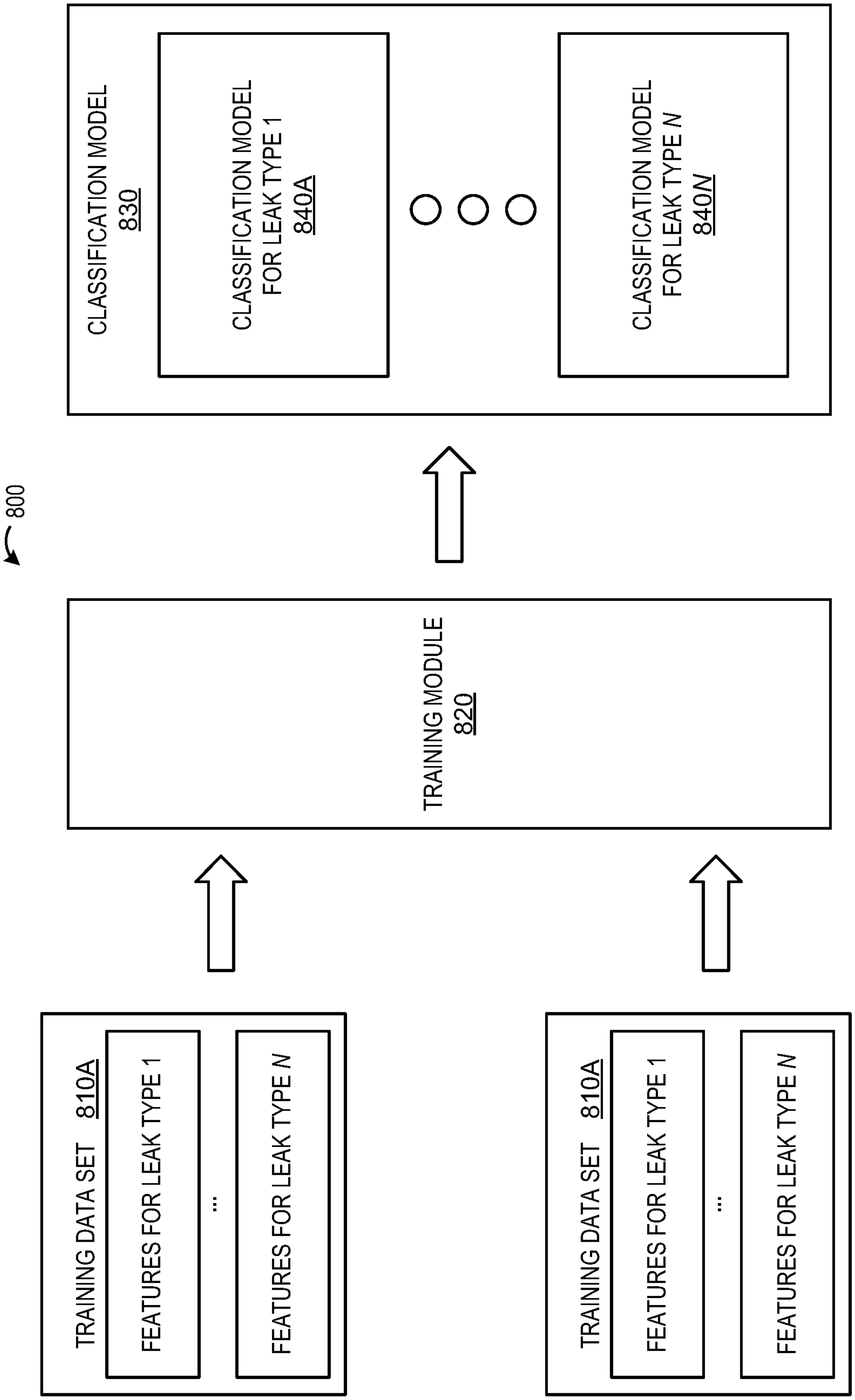
FIG. 8 shows an example system.

Turning now to FIG. 8, a system 800 for is shown. The system 800 may be configured to use machine learning techniques to train, based on an analysis of a plurality of training datasets 810A-810B by a training module 820, a classification model 830 (e.g., a multiclass classification model). Functions of the system 800 described herein may be performed, for example, by the computing device 104, the device 102, and/or another computing device in communication with the computing device 104 and/or the device 102. The plurality of training datasets 810A-810B may be associated with the plurality of network leak types described herein. For example, the training dataset 810A may comprise one or more first RF radiation patterns and/or a first plurality of features derived/extracted therefrom associated with the plurality of network leak types, and the training dataset 810B may comprise one or more second RF radiation patterns and/or a second plurality of features derived/extracted therefrom associated with the plurality of network leak types.

Each RF radiation pattern, as well as the plurality of features derived/extracted therefrom, in the training datasets 810A, 810B may be labeled to indicate a particular network leak type(s) associated with that RF radiation pattern/features. The training datasets 810A, 810B may be based on, or comprise, the data stored in the database 103 described herein. Such data may be randomly assigned to the training dataset 810A, the training dataset 810B, and/or to a testing dataset. In some implementations, assignment may not be completely random and one or more criteria may be used during the assignment, such as ensuring that similar numbers of RF radiation patterns and corresponding features are in each of the training and testing datasets. In general, any suitable method may be used to assign the data to the training and/or testing datasets.

The training module 820 may train the classification model 830 by determining/extracting the features from the training dataset 810A and/or the training dataset 810B in a variety of ways. For example, the training module 820 may determine/extract a feature set from the training dataset 810A and/or the training dataset 810B by performing a 3D orbital analysis of each RF radiation pattern as described herein. The training module 820 may use the feature sets to generate classification models 840A-840N that are each associated with a particular network leak source(s) and/or a particular network leak type(s).

The training dataset 810A and/or the training dataset 810B may be analyzed to determine any dependencies, associations, and/or correlations between features in the training dataset 810A and/or the training dataset 810B. The identified correlations may have the form of a list of features that are associated with different labeled predictions. The term "feature," as used herein, may refer to any characteristic of an item of data that may be used to determine whether the item of data falls within one or more specific categories or within a range. By way of example, the features described herein may comprise one or more features that may be correlative (or not correlative as the case may be) with a particular network leak type. A feature selection technique may comprise one or more feature selection rules. The one or more feature selection rules may comprise a feature occurrence rule. The feature occurrence rule may comprise determining which features in the training dataset 810A occur over a threshold number of times and identifying those features that satisfy the threshold as candidate features. For example, any features that appear greater than or equal to 5 times in the training dataset 810A may be considered as candidate features. Any features appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training dataset 810A to generate a first list of features. A final list of candidate features may be analyzed according to additional feature selection techniques to determine one or more candidate feature groups (e.g., groups of features that may be used to determine a prediction). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 800. Instead, features may be selected on the basis of scores in various statistical tests for their correlation with the outcome variable (e.g., a prediction).

As another example, one or more candidate feature groups may be selected according to a wrapper method. A wrapper method may be configured to use a subset of features and train the classification model 830 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate feature groups. Forward feature selection is an iterative method that begins with no features. In each iteration, the feature which best improves the model is added until an addition of a new variable does not improve the performance of the model. As another example, backward elimination may be used to identify one or more candidate feature groups. Backward elimination is an iterative method that begins with all features in the model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 820 has generated a feature set(s), the training module 820 may generate the classification models 840A-840N based on the feature set(s). A machine learning-based classification model (e.g., any of the classification models 840A-840N) may refer to a complex mathematical model for data classification that is generated using machine-learning techniques as described herein. In one example, a machine learning-based prediction model may include a map of support vectors that represent boundary features. By way of example, boundary features may be selected from, and/or represent the highest-ranked features in, a feature set. The training module 820 may use the feature sets extracted from the training dataset 810A and/or the training dataset 810B to build the classification models 840A-840N for each classification category (e.g., a particular network leak type). In some examples, the classification models 840A-840N may be combined into a single classification model 840 (e.g., an ensemble model). Similarly, the classification model 830 may represent a single classifier containing a single or a plurality of classification models 840 and/or multiple classifiers containing a single or a plurality of classification models 840 (e.g., an ensemble classifier).

The extracted features (e.g., one or more candidate features) may be combined in the classification models 840A-840N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting classification model 830 may comprise a decision rule or a mapping for each candidate feature in order to assign a prediction to a class.

The classification model 830 may be trained to receive an unknown RF radiation pattern (e.g., the RF radiation pattern 602) and/or a value(s) for each feature of a plurality of features associated with the unknown RF radiation pattern and subsequently determine a best-fitting known radiation pattern based on the input(s). For example, the classification model 830 may comprise the classification models 840A-840N that are each associated with a particular network leak source(s) and/or a particular network leak type(s), and the classification model 830 may output a confidence score associated with the unknown RF radiation pattern and each classification model of the classification models 840A-840N. For example, each confidence score may indicate a corresponding level of confidence that the unknown RF radiation pattern is associated with a particular model.

Figure 9:
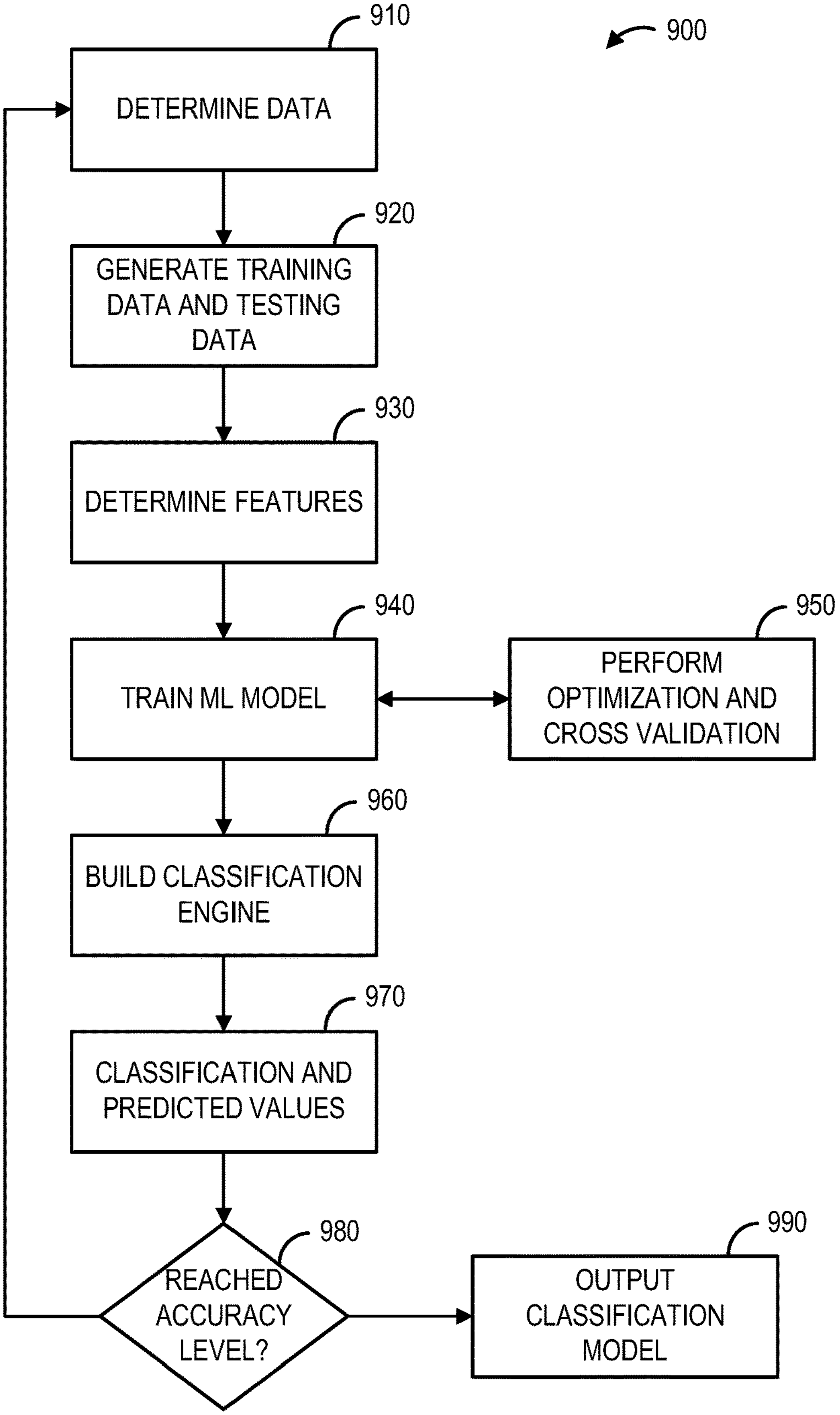
FIG. 9 shows a flowchart of an example method.

FIG. 9 is a flowchart illustrating an example training method 900 for generating the classification model 830 using the training module 820. The training module 820 may implement supervised, unsupervised, and/or semi-supervised (e.g., reinforcement based) learning. The method 900 illustrated in FIG. 9 is an example of a supervised learning method; variations of this example of training method may be analogously implemented to train unsupervised and/or semi-supervised machine learning models. The method 900 may be implemented by any of the devices shown in any of the systems 100, 200, or 400.

At step 910, the training method 900 may determine (e.g., access, receive, retrieve, etc.) first training data and second training data (e.g., the training datasets 810A-810B). The first training data and the second training data may each comprise one or more RF radiation patterns and corresponding features and labels. The training method 900 may generate, at step 920, a training dataset and a testing dataset. The training dataset and the testing dataset may be generated by randomly assigning data from the first training data and/or the second training data to either the training dataset or the testing dataset. In some implementations, the assignment of data as training or test data may not be completely random. As an example, only the data for a specific network leak type(s) may be used to generate the training dataset and the testing dataset. The training method 900 may determine (e.g., extract, select, etc.), at step 930, one or more features that may be used by, for example, a classifier to differentiate among different classifications (e.g., predictions). The one or more features may comprise a set of features. As an example, the training method 900 may determine a set features from the first training data. As another example, the training method 900 may determine a set of features from the second training data.

The training method 900 may train one or more machine learning models (e.g., one or more prediction models, neural networks, deep-learning models, etc.) using the one or more features at step 940. In one example, the machine learning models may be trained using supervised learning. In another example, other machine learning techniques may be used, including unsupervised learning and semi-supervised. The machine learning models trained at step 940 may be selected based on different criteria depending on the problem to be solved and/or data available in the training dataset. For example, machine learning models may suffer from different degrees of bias. Accordingly, more than one machine learning model may be trained at 940, and then optimized, improved, and cross-validated at step 950.

The training method 900 may select one or more machine learning models to build the classification model 830 at step 960. The classification model 830 may be evaluated using the testing dataset. The classification model 830 may analyze the testing dataset and generate classification values and/or predicted values (e.g., predictions) at step 970. Classification and/or prediction values may be evaluated at step 980 to determine whether such values have achieved a desired accuracy level. Performance of the classification model 830 may be evaluated in a number of ways based on a number of true positives, false positives, true negatives, and/or false negatives classifications of the plurality of data points indicated by the classification model 830. Related to these measurements are the concepts of recall and precision. Generally, recall refers to a ratio of true positives to a sum of true positives and false negatives, which quantifies a sensitivity of the classification model 830. Similarly, precision refers to a ratio of true positives a sum of true and false positives. When such a desired accuracy level is reached, the training phase ends and the classification model 830 may be output at step 990; when the desired accuracy level is not reached, however, then a subsequent iteration of the training method 900 may be performed starting at step 910 with variations such as, for example, considering a larger collection of RF radiation patterns for one or more network leak types. The classification model 830 may be output at step 990.

Figure 10:
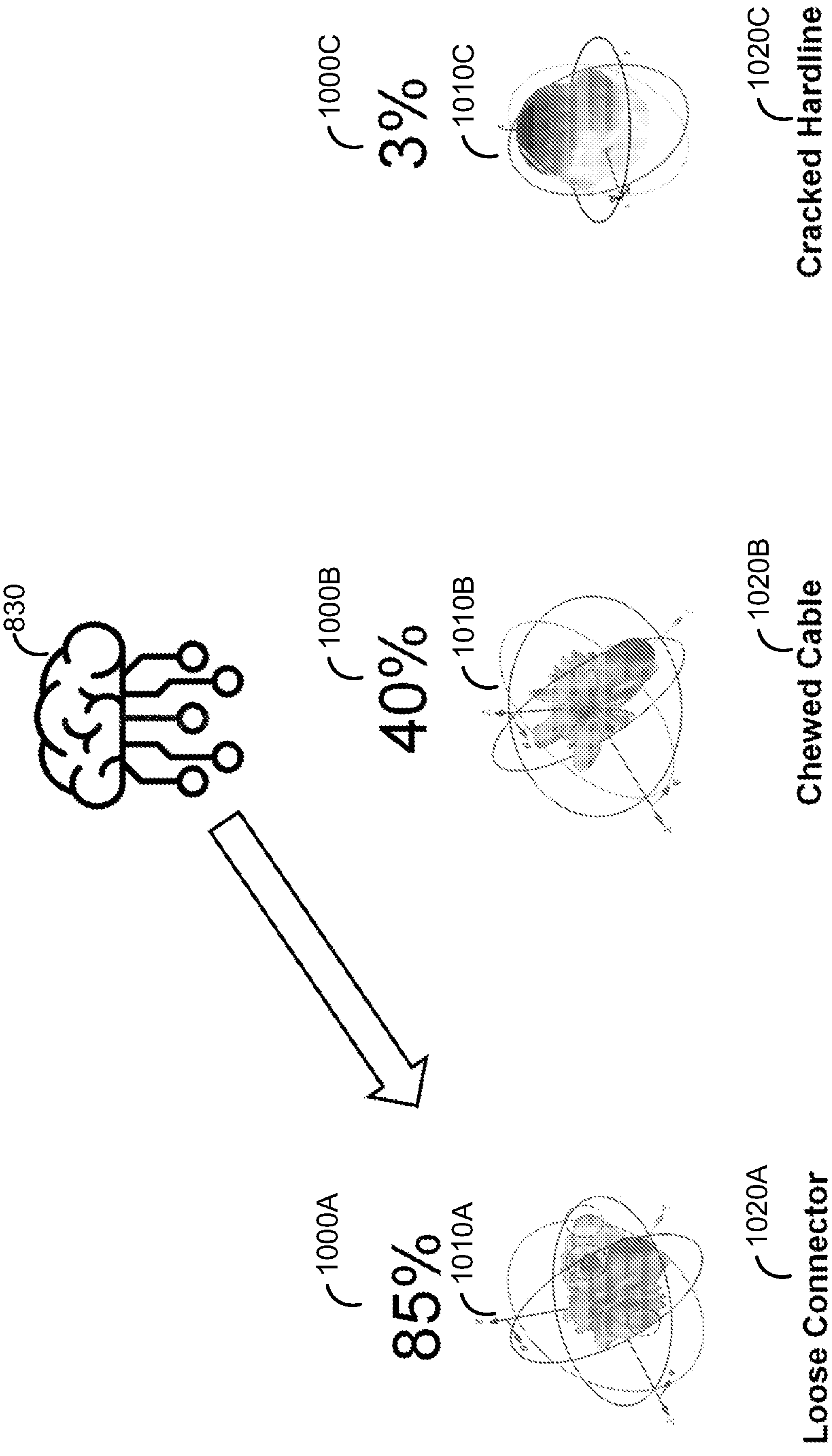
FIG. 10 shows an example classification model with example leak types.

The classification model 830, once trained according the method 900, may receive an unknown RF radiation pattern (e.g., the RF radiation pattern 602) and/or value(s) for each feature of a plurality of features associated with the unknown RF radiation pattern as an input(s). The classification model 830 may analyze/process the input(s) to determine a level of confidence that the unknown RF radiation pattern is associated with a particular network leak type (e.g., a confidence score). For example, as shown in FIG. 10, the classification model 830 may receive example RF radiation patterns 1010A-1010C and output confidence scores 1000A-1000C to indicate a relative level of confidence that each of the RF radiation patterns 1010A-1010B corresponds to (e.g., is a best fit for) the unknown RF radiation pattern. The confidence scores 1000A-1000B may be output with an indication of a network leak source(s) 1020A-1020B as well in some examples.

Figure 11:
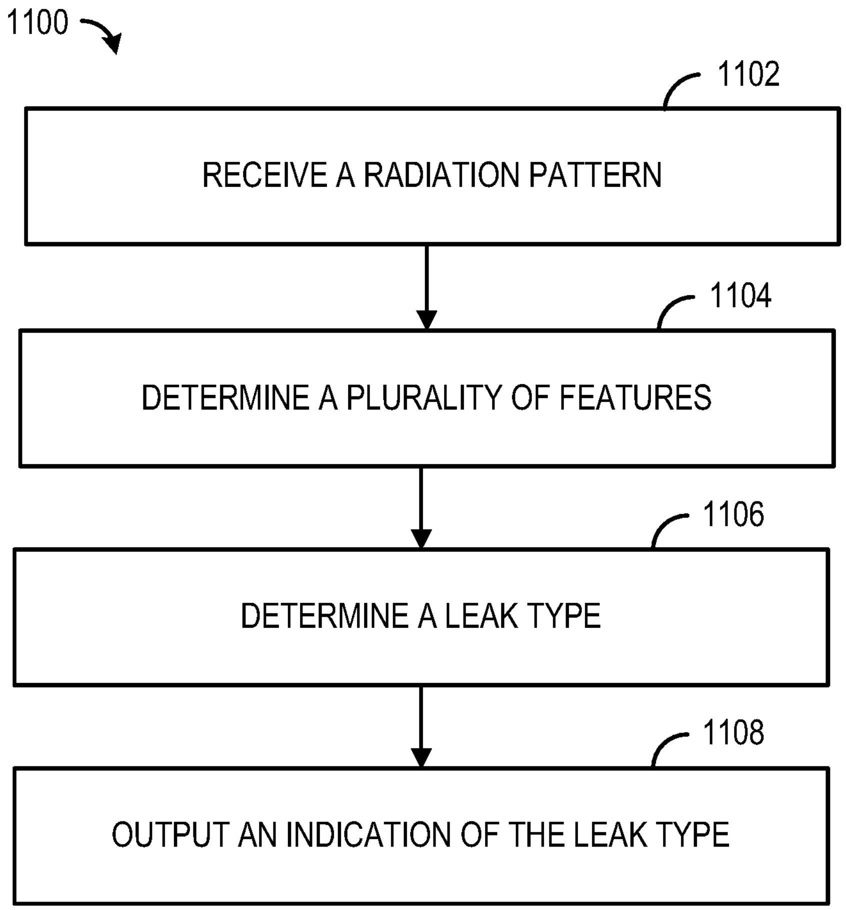
FIG. 11 shows a flowchart of an example method.

FIG. 11 shows an example method 1100 flowchart for identifying network leaks. The steps of the method 1100 may be performed one or more of the devices/entities shown in the systems 100, 200, and/or 400 (e.g., the device 102). At step 1110, a computing device may a first representation of a first radio frequency (RF) radiation pattern associated with a first network leak. The first representation of the first RF radiation pattern may comprise a three-dimensional plot indicative of a distribution of RF energy in space as a function of direction with respect to a source of the first network leak. The source of the first network leak may be associated with one or more of: a damaged wire, a damaged cable, a damaged connector, a damaged device, or an improperly-installed device (e.g., associated with a content distribution network.)

At step 1120, the computing device may determine a first plurality of features associated with the first RF radiation pattern and the first network leak. For example, the computing device may determine the first plurality of features based on the first representation of the first RF radiation pattern. The first plurality of features associated with the first RF radiation pattern may comprise at least one of: a maximum radiation power associated with first RF radiation pattern; a minimum radiation power associated with first RF radiation pattern; a direction of the maximum radiation; a direction of the minimum radiation power; a width of a main lobe of the first representation; a level of power associated with at least one side lobe of the first representation; a polarization of the first RF radiation pattern; a frequency of the first RF radiation pattern; an impedance of the first RF radiation pattern; and/or the like.

In some examples, determining the first plurality of features associated with the first RF radiation pattern and the first network leak may comprise normalizing a scale of the first representation based on a scale of at least one representation, of the plurality of representations of radiation patterns of a multiclass classification model, associated with the leak type associated with the first network leak. The multiclass classification model may comprise at least one of: a neural network, a support vector machine, a decision tree, or a random forest. Additionally, or in the alternative, determining the first plurality of features associated with the first RF radiation pattern and the first network leak may comprise determining a three-dimensional orbital analysis of the first RF radiation pattern. For example, the three-dimensional orbital analysis may be based on or comprise a series of rotations of the first representation.

At step 1120, the computing device may determine a leak type associated with the first network leak. For example, the computing device may determine the leak type based on the first plurality of features and the multiclass classification model. The multiclass classification model may comprise a plurality of representations of radiation patterns associated with a plurality of leak types. Each leak type of the plurality of leak types may be associated with at least one representation of the plurality of representations of radiation patterns of the multiclass classification model.

Determining the leak type associated with the first network leak may comprise determining a best fit representation, of the plurality of representations of radiation patterns of the multiclass classification model, associated with the first representation. For example, determining the best fit representation may be based on a plurality of features associated with each representation of the plurality of representations of radiation patterns of the multiclass classification model. Based on the radiation pattern associated with the best fit representation, the leak type associated with the first network leak may be determined. The radiation pattern associated with the best fit representation may be one of the plurality of leak types. At step 1130, the computing device output may an indication of the leak type associated with the first network leak. For example, the multiclass classification model may output the indication as a confidence score.

Figure 12:
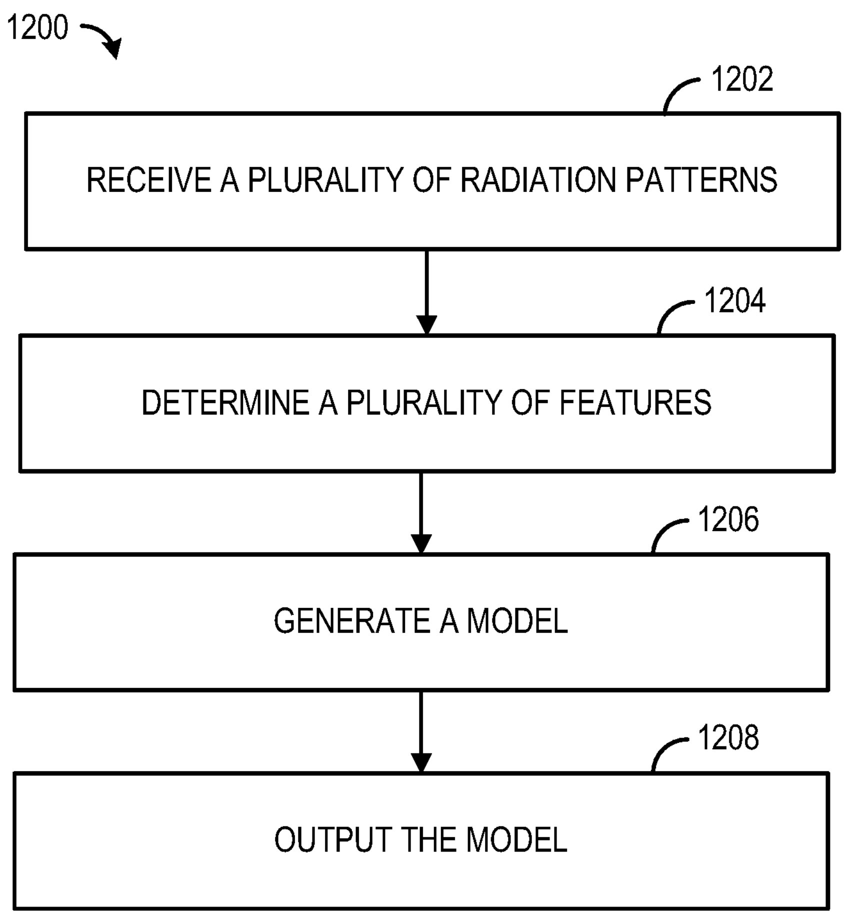
FIG. 12 shows a flowchart of an example method.

FIG. 12 shows an example method 1200 flowchart for identifying network leaks. The steps of the method 1200 may be performed one or more of the devices/entities shown in the systems 100, 200, and/or 400 (e.g., the device 102). At step 1210, a computing device may receive a plurality of representations of a plurality of radio frequency (RF) radiation patterns. The plurality of representations may be associated with a plurality of network leak types.

At step 1220, the computing device may determine a plurality of features defining a corresponding RF radiation pattern for each representation of the plurality of representations. Each representation of the plurality of representations may comprise a three-dimensional plot indicative of a distribution of RF energy in space as a function of direction with respect to a source of a network leak corresponding to one of the plurality of network leak types. The plurality of features associated with the each RF radiation pattern may comprise at least one of: a maximum radiation power associated with the first RF radiation pattern; a minimum radiation power associated with the first RF radiation pattern; a direction of the maximum radiation; a direction of the minimum radiation power; a width of a main lobe of the first representation; a level of power associated with at least one side lobe of the first representation; a polarization of the first RF radiation pattern; a frequency of the first RF radiation pattern; an impedance of the first RF radiation pattern; and/or the like.

At step 1220, the computing device may generate a multiclass classification model. For example, the computing device may generate the multiclass classification model based on the plurality of features for each representation of the plurality of representations. The multiclass classification model may comprise at least one of: a neural network, a support vector machine, a decision tree, or a random forest. At step 1220, the computing device may output (e.g., via the multiclass classification model) an indication of a network leak type of the plurality of network leak types. The indicated network leak type may be associated with a first network leak. The first network leak may comprise a first plurality of features. The first plurality of features may be associated with the plurality of features defining the corresponding RF radiation pattern associated with the network leak type.

Figure 13:
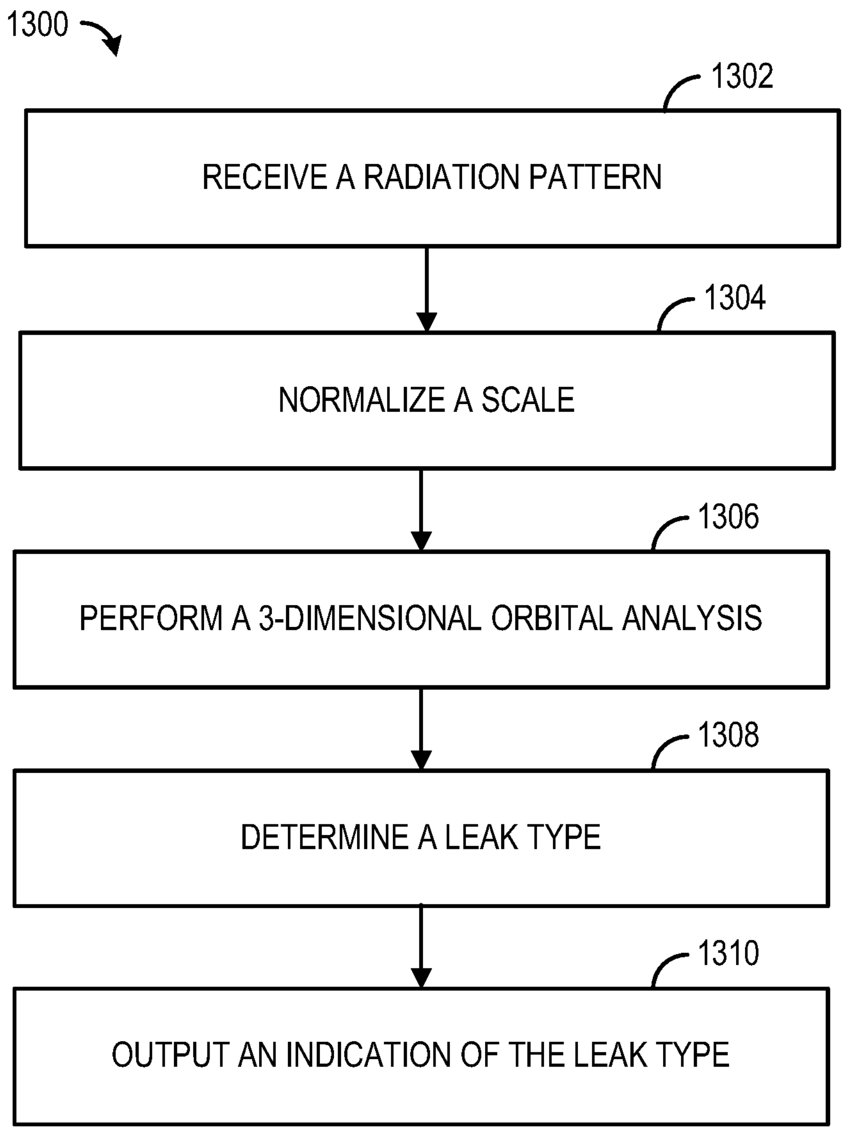
FIG. 13 shows a flowchart of an example method.

FIG. 13 shows an example method 1300 flowchart for identifying network leaks. The steps of the method 1300 may be performed one or more of the devices/entities shown in the systems 100, 200, and/or 400 (e.g., the device 102). At step 1310, a computing device may receive a first representation of a first radio frequency (RF) radiation pattern associated with a first network leak. The first representation of the first RF radiation pattern may comprise a three-dimensional plot indicative of a distribution of RF energy in space as a function of direction with respect to a source of the first network leak. The source of the first network leak may be associated with one or more of: a damaged wire, a damaged cable, a damaged connector, a damaged device, or an improperly-installed device (e.g., associated with a content distribution network.)

At step 1320, the computing device may normalize a scale of the first representation. For example, the scale of the first representation may be normalized based on a scale of at least one representation of a plurality of representations of radiation patterns of a multiclass classification model. The plurality of representations of radiation patterns may be associated with the leak type associated with the first network leak. The multiclass classification model may comprise at least one of: a neural network, a support vector machine, a decision tree, or a random forest.

At step 1330, the computing device may determine a three-dimensional orbital analysis of the first RF radiation pattern. For example, the three-dimensional orbital analysis may be based on or comprise a series of rotations of the first representation. At step 1340, the computing device may determine a first plurality of features associated with the first RF radiation pattern and the first network leak. For example, each rotation of the series of rotations may be indicative of at least one feature of the first plurality of features. The first plurality of features associated with the first RF radiation pattern may comprise at least one of: a maximum radiation power associated with first RF radiation pattern; a minimum radiation power associated with first RF radiation pattern; a direction of the maximum radiation; a direction of the minimum radiation power; a width of a main lobe of the first representation; a level of power associated with at least one side lobe of the first representation; a polarization of the first RF radiation pattern; a frequency of the first RF radiation pattern; an impedance of the first RF radiation pattern; and/or the like.

At step 1350, the computing device may determine a leak type associated with the first network leak. For example, the computing device may determine the leak type based on the first plurality of features and the multiclass classification model. Determining the leak type associated with the first network leak may comprise determining a best fit representation, of the plurality of representations of radiation patterns of the multiclass classification model, associated with the first representation. For example, determining the best fit representation may be based on a plurality of features associated with each representation of the plurality of representations of radiation patterns of the multiclass classification model. Based on the radiation pattern associated with the best fit representation, the leak type associated with the first network leak may be determined. The radiation pattern associated with the best fit representation may be one of the plurality of leak types. At step 1360, the computing device may output an indication of the leak type associated with the first network leak. For example, the multiclass classification model may output the indication as a confidence score.

Figure 14:
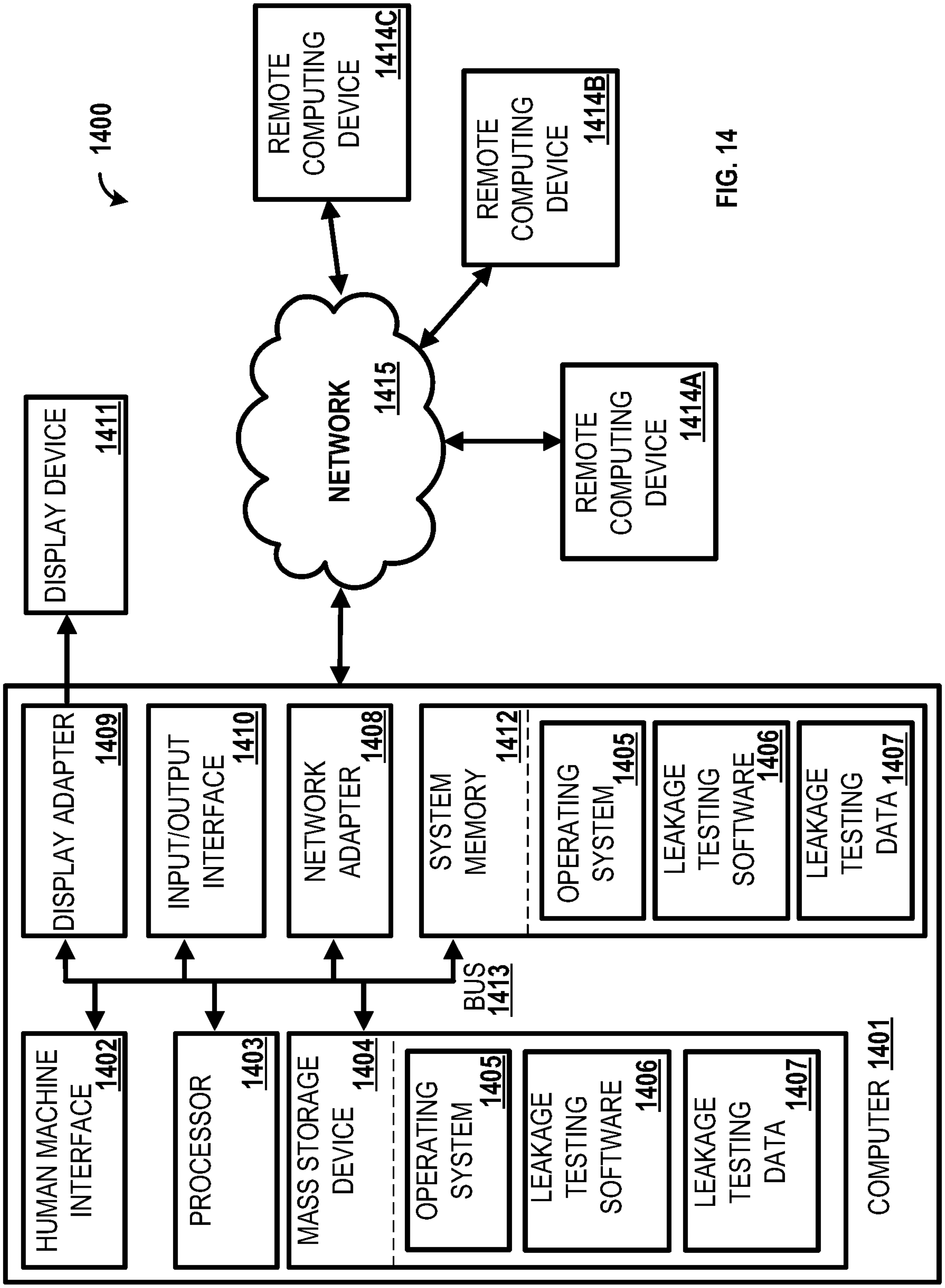
FIG. 14 shows an example system.

In an example, the methods and systems may be implemented on a computer 1401 as shown in FIG. 14 and described below. By way of example, any of the devices shown in any of the systems 100, 200, or 400 may be a computer 1401 as shown in FIG. 14. Similarly, the methods and systems disclosed may utilize one or more computers to perform one or more functions in one or more locations. FIG. 14 is a block diagram illustrating an exemplary operating environment 1400 for performing the disclosed methods. This exemplary operating environment 1400 is only an example of an operating environment and is not intended to suggest any limitation as to the scope of use or functionality of operating environment architecture. Neither should the operating environment 1400 be interpreted as having any dependency or requirement relating to any one or combination of components illustrated in the exemplary operating environment 1400.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media such as memory storage devices.

Further, one skilled in the art will appreciate that the systems and methods disclosed herein may be implemented via a general-purpose computing device in the form of a computer 1401. The computer 1401 may comprise one or more components, such as one or more processors 1403, a system memory 1412, and a bus 1413 that couples various components of the computer 1401 comprising the one or more processors 1403 to the system memory 1412. In the case of multiple processors 1403, the computer 1401 may utilize parallel computing.

The bus 1413 may comprise one or more of several possible types of bus structures, such as a memory bus, memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1413, and all buses specified in this description may also be implemented over a wired or wireless network connection and one or more of the components of the computer 1401, such as the one or more processors 1403, a mass storage device 1404, an operating system 1405, leakage testing software 1406, leakage testing data 1407, a network adapter 1408, the system memory 1412, an Input/Output Interface 1410, a display adapter 1409, a display device 1411, and a human machine interface 1402, may be contained within one or more remote computing devices 1414A-1014C at physically separate locations, connected through buses of this form, in effect implementing a fully distributed system.

The computer 1401 may operate on and/or comprise a variety of computer-readable media (e.g., non-transitory). Computer-readable media may be any available media that is accessible by the computer 1401 and comprises non-transitory, volatile, and/or non-volatile media, removable and non-removable media. The system memory 1412 has computer-readable media in the form of volatile memory, such as random access memory (RAM), and/or non-volatile memory, such as read-only memory (ROM). The system memory 1412 may comprise data such as the leakage testing data 1407 and/or program modules such as the operating system 1405 and the leakage testing software 1406 that are accessible to and/or are operated on by the one or more processors 1403.

The computer 1401 may also comprise other removable/non-removable, volatile/non-volatile computer storage media. The mass storage device 1404 may provide non-volatile storage of computer code, computer-readable instructions, data structures, program modules, and other data for the computer 1401. The mass storage device 1404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1404, such as, by way of example, the operating system 1405 and the leakage testing software 1406. One or more of the operating system 1405 and the leakage testing software 1406 (or some combination thereof) may comprise elements of the programming and the leakage testing software 1406. The leakage testing data 1407 may also be stored on the mass storage device 1404. The leakage testing data 1407 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple locations within the network 1415.

A user may enter commands and information into the computer 1401 via an input device (not shown). Such input devices may comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1403 via a human-machine interface 1402 that is coupled to the bus 1413, but may be connected by other interface and bus structures, such as a parallel port, game port, an IEEE 1394 Port (also known as a Firewire port), a serial port, network adapter 1408, and/or a universal serial bus (USB).

A display device 1411 may also be connected to the bus 1413 via an interface, such as a display adapter 1409. It is contemplated that the computer 1401 may have more than one display adapter 1409 and the computer 1401 may have more than one display device 1411. A display device 1411 may be a monitor, an LCD (Liquid Crystal Display), light-emitting diode (LED) display, television, smart lens, smart glass, and/or a projector. In addition to the display device 1411, other output peripheral devices may comprise components such as speakers (not shown) and a printer (not shown) which may be connected to the computer 1401 via Input/Output Interface 1410. Any step and/or result of the methods may be output (or caused to be output) in any form to an output device. Such output may be any form of visual representation, including, but not limited to, textual, graphical, animation, audio, tactile, and the like. The display 1411 and computer 1401 may be part of one device, or separate devices.

The computer 1401 may operate in a networked environment using logical connections to one or more remote computing devices 1414A-1014C. By way of example, a remote computing device 1414A-1014C may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1401 and a remote computing device 1414A-1014C may be made via a network 1415, such as a local area network (LAN) and/or a general wide area network (WAN). Such network connections may be through the network adapter 1408. The network adapter 1408 may be implemented in both wired and wireless environments. Such networking environments are conventional and commonplace in dwellings, offices, enterprise-wide computer networks, intranets, and the Internet.

Application programs and other executable program components such as the operating system 1405 are illustrated herein as discrete blocks, although it is recognized that such programs and components may reside at various times in different storage components of the computing device 1401, and are executed by the one or more processors 1403 of the computer 1401. An implementation of the leakage testing software 1406 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ artificial intelligence (AI) techniques such as machine learning and iterative learning. Examples of such techniques comprise, but are not limited to, expert systems, case based reasoning. Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

receiving, by a computing device, a first representation of a first radio frequency (RF) radiation pattern associated with a first network leak;

determining, based on the first representation of the first RF radiation pattern, a first plurality of features associated with the first RF radiation pattern and the first network leak;

determining, based on the first plurality of features and a multiclass classification model, a leak type associated with the first network leak; and outputting, by the multiclass classification model, an indication of the leak type associated with the first network leak.

2. The method of claim 1, wherein the first representation of the first RF radiation pattern comprises a three-dimensional plot indicative of a distribution of RF energy in space as a function of direction with respect to a source of the first network leak.

3. The method of claim 2, wherein the source of the first network leak is associated with one or more of: a damaged wire, a damaged cable, a damaged connector, a damaged device, or an improperly-installed device.

4. The method of claim 1, wherein the plurality of features associated with the first RF radiation pattern comprises at least one of:

a maximum radiation power associated with first RF radiation pattern;

a minimum radiation power associated with first RF radiation pattern;

a direction of the maximum radiation;

a direction of the minimum radiation power;

a width of a main lobe of the first representation;

a level of power associated with at least one side lobe of the first representation;

a polarization of the first RF radiation pattern;

a frequency of the first RF radiation pattern; or an impedance of the first RF radiation pattern.

5. The method of claim 1, wherein the multiclass classification model comprises a plurality of representations of radiation patterns associated with a plurality of leak types, and wherein each leak type of the plurality of leak types is associated with at least one representation of the plurality of representations of radiation patterns of the multiclass classification model.

6. The method of claim 5, wherein determining the first plurality of features associated with the first RF radiation pattern and the first network leak comprises at least one of:

normalizing a scale of the first representation based on a scale of at least one representation, of the plurality of representations of radiation patterns of the multiclass classification model, associated with the leak type associated with the first network leak; or determining, based on a series of rotations of the first representation, a three-dimensional orbital analysis of the first RF radiation pattern.

7. The method of claim 5, wherein determining the leak type associated with the first network leak comprises:

determining, based on a plurality of features associated with each representation of the plurality of representations of radiation patterns of the multiclass classification model, a best fit representation, of the plurality of representations of radiation patterns of the multiclass classification model, associated with the first representation; and determining, based on the radiation pattern associated with the best fit representation, the leak type associated with the first network leak, wherein the radiation pattern associated with the best fit representation is one of the plurality of leak types.

8. A method comprising:

receiving, by a computing device, a plurality of representations of a plurality of radio frequency (RF) radiation patterns associated with a plurality of network leak types;

determining, for each representation of the plurality of representations, a plurality of features defining a corresponding RF radiation pattern, of the plurality of RF radiation patterns, for that representation;

generating, based on the plurality of features for each representation of the plurality of representations, a multiclass classification model; and outputting, by the multiclass classification model, an indication of a network leak type, of the plurality of network leak types, associated with a first network leak comprising a first plurality of features, wherein the first plurality of features are associated with the plurality of features defining the corresponding RF radiation pattern associated with the network leak type.

9. The method of claim 8, wherein the multiclass classification model comprises at least one of: a neural network, a support vector machine, a decision tree, or a random forest.

10. The method of claim 8, wherein each representation of the plurality of representations comprises a three-dimensional plot indicative of a distribution of RF energy in space as a function of direction with respect to a source of a network leak corresponding to one of the plurality of network leak types.

11. The method of claim 8, wherein the plurality of features for each representation of the plurality of representations comprises at least one of:

a maximum radiation power associated with one of the plurality of RF radiation patterns;

a minimum radiation power associated with one of the plurality of RF radiation patterns;

a direction of the maximum radiation;

a direction of the minimum radiation power;

a width of a main lobe of the representation;

a level of power associated with at least one side lobe of the first representation;

a polarization associated with one of the plurality of RF radiation patterns;

a frequency associated with one of the plurality of RF radiation patterns; or an impedance associated with one of the plurality of RF radiation patterns.

12. The method of claim 8, wherein determining, for each representation of the plurality of representations, the plurality of features defining the corresponding RF radiation pattern, of the plurality of RF radiation patterns, for that representation comprises at least one of:

determining a scale of the representation; or determining, based on a series of rotations of the representation, a three-dimensional orbital analysis of the corresponding RF radiation pattern.

13. The method of claim 8, wherein outputting the indication of the network leak type comprises determining, based on the plurality of features defining the corresponding RF radiation pattern for each representation of the plurality of representations, and based on the first plurality of features associated with the first network leak, a best fit representation of the plurality of representations.

14. The method of claim 13, further comprising determining, based on the radiation pattern associated with the best fit representation, the network leak type.

15. A method comprising:

receiving, by a computing device, a first representation of a first radio frequency (RF) radiation pattern associated with a first network leak;

normalizing a scale of the first representation;

determining a three-dimensional orbital analysis of the first RF radiation pattern;

determining, based on the normalized scale of the first representation and the three-dimensional orbital analysis of the first RF radiation pattern, a first plurality of features associated with the first RF radiation pattern and the first network leak;

determining, based on the first plurality of features and a multiclass classification model, a leak type associated with the first network leak; and outputting, by the multiclass classification model, an indication of the leak type associated with the first network leak.

16. The method of claim 15, wherein determining the three-dimensional orbital analysis of the first RF radiation pattern comprises: determining, based on a series of rotations of the first representation, the three-dimensional orbital analysis of the first RF radiation pattern, wherein each rotation of the series of rotations is indicative of at least one feature of the first plurality of features.

17. The method of claim 15, wherein normalizing the scale of the first representation comprises: normalizing the scale of the first representation based on a scale of at least one representation, of a plurality of representations of radiation patterns, associated with the multiclass classification model.

18. The method of claim 17, wherein the at least one representation is associated with the leak type associated with the first network leak.

19. The method of claim 15, wherein the multiclass classification model comprises a plurality of representations of radiation patterns associated with a plurality of leak types, and wherein each leak type of the plurality of leak types is associated with at least one representation of the plurality of representations of radiation patterns of the multiclass classification model.

20. The method of claim 15, wherein the multiclass classification model comprises at least one of: a neural network, a support vector machine, a decision tree, or a random forest.

* * * * *